US011524281B2

(12) United States Patent
Mao et al.

(10) Patent No.: US 11,524,281 B2
(45) Date of Patent: Dec. 13, 2022

(54) PHOSPHORUS-CONTAINING MOLECULAR SIEVE, ITS PREPARATION AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Yichao Mao, Beijing (CN); Mingfeng Li, Beijing (CN); Xiangyun Long, Beijing (CN); Runqiang Zhang, Beijing (CN); Yang Zhao, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 34 days.

(21) Appl. No.: 16/760,562

(22) PCT Filed: Oct. 22, 2018

(86) PCT No.: PCT/CN2018/111166
§ 371 (c)(1),
(2) Date: Apr. 30, 2020

(87) PCT Pub. No.: WO2019/085777
PCT Pub. Date: May 9, 2019

(65) Prior Publication Data
US 2020/0338540 A1    Oct. 29, 2020

(30) Foreign Application Priority Data

Oct. 31, 2017 (CN) .......................... 201711046549.4
Oct. 31, 2017 (CN) .......................... 201711048395.2

(51) Int. Cl.
*B01J 29/16* (2006.01)
*B01J 29/85* (2006.01)
(Continued)

(52) U.S. Cl.
CPC .............. *B01J 29/85* (2013.01); *B01J 23/883* (2013.01); *B01J 23/888* (2013.01); *B01J 29/06* (2013.01); *B01J 29/08* (2013.01); *B01J 29/084* (2013.01); *B01J 29/085* (2013.01); *B01J 35/026* (2013.01); *B01J 37/06* (2013.01); *B01J 37/10* (2013.01); *B01J 37/28* (2013.01); *C01B 39/54* (2013.01); *C10G 47/20* (2013.01); *B01J 35/1019* (2013.01); *B01J 35/1023* (2013.01); *B01J 35/1038* (2013.01); *B01J 35/1042* (2013.01); *B01J 2029/081* (2013.01); *B01J 2229/16* (2013.01); *B01J 2229/186* (2013.01);
(Continued)

(58) Field of Classification Search
CPC . B01J 29/06; B01J 29/08; B01J 29/084; B01J 2029/081; B01J 29/085; B01J 2229/16; B01J 2229/18; B01J 2229/186; B01J 2229/37; B01J 23/883; B01J 23/888; B01J 35/026; B01J 35/1019; B01J 35/1023; B01J 35/1042; B01J 35/1038; B01J 37/06; B01J 37/10; B01J 37/28; B01J 29/146; B01J 29/16; C01B 39/24; C01B 39/54; C10G 47/20; C10G 47/16; C10G 2300/107; C10G 2300/1077; C10G 2300/201; C10G 2300/301; C10G 2300/302; C10G 2300/308; C10G 2300/70; C10G 2300/4018; C10G 2300/4006; C10G 2300/4012; C10G 47/10; C10G 47/12; C01P 2002/70; C01P 2002/72; C01P 2002/77; C01P 2002/86; C01P 2002/12; C01P 2004/60; C01P 2006/12; C01P 2006/14
USPC ................ 502/60, 73, 65, 79, 85, 208, 214; 423/700, 713, 714; 208/107, 108, 109, 208/110, 111.3, 111.35
See application file for complete search history.

(56) References Cited

U.S. PATENT DOCUMENTS 5,308,472 A * 5/1994 Dai ........................ C10G 47/20
208/111.3
6,974,889 B1 12/2005 Verduijn et al.
8,334,231 B2 * 12/2012 Mao ........................ C10G 47/12
502/66

FOREIGN PATENT DOCUMENTS

CN         1279130 A     1/2001
CN         1350886 A     5/2002
(Continued)

OTHER PUBLICATIONS

Mao et al., Machine translation of the description section of CN 106268917, Jan. 2017, 6 pages.*
(Continued)

*Primary Examiner* — Elizabeth D Wood
(74) *Attorney, Agent, or Firm* — Novick, Kim & Lee, PLLC; Allen Xue

(57) ABSTRACT

A phosphorus-containing molecular sieve has a phosphorus content of about 0.3-5 wt %, a pore volume of about 0.2-0.95 ml/g, and a ratio of B acid content to L acid content of about 2-10. The molecular sieve has a specific combination of characteristics, including a high ratio of B acid content to L acid content, thereby exhibiting higher hydrocracking activity and ring-opening selectivity when used in the preparation of a hydrocracking catalyst.

19 Claims, 1 Drawing Sheet

(51) Int. Cl.
  *B01J 23/883* (2006.01)
  *B01J 23/888* (2006.01)
  *B01J 35/02* (2006.01)
  *B01J 37/06* (2006.01)
  *B01J 37/10* (2006.01)
  *C01B 39/54* (2006.01)
  *C10G 47/20* (2006.01)
  *B01J 29/06* (2006.01)
  *B01J 29/08* (2006.01)
  *B01J 37/28* (2006.01)
  *B01J 35/10* (2006.01)

(52) U.S. Cl.
  CPC ....... *B01J 2229/37* (2013.01); *C01P 2002/70* (2013.01); *C01P 2002/72* (2013.01); *C01P 2002/77* (2013.01); *C01P 2002/86* (2013.01); *C01P 2004/60* (2013.01); *C01P 2006/12* (2013.01); *C01P 2006/14* (2013.01); *C10G 2300/107* (2013.01); *C10G 2300/1077* (2013.01); *C10G 2300/201* (2013.01); *C10G 2300/202* (2013.01); *C10G 2300/301* (2013.01); *C10G 2300/302* (2013.01); *C10G 2300/308* (2013.01); *C10G 2300/4006* (2013.01); *C10G 2300/4012* (2013.01); *C10G 2300/4018* (2013.01); *C10G 2300/70* (2013.01)

(56) References Cited

FOREIGN PATENT DOCUMENTS

| | | |
|---|---|---|
| CN | 1088407 C | 7/2002 |
| CN | 1382768 A | 12/2002 |
| CN | 1727280 A | 2/2006 |
| CN | 101343068 A | 1/2009 |
| CN | 101757931 A | 6/2010 |
| CN | 101759198 A | 6/2010 |
| CN | 104211083 A | 12/2014 |
| CN | 104549418 A | 4/2015 |
| CN | 104843737 A | 8/2015 |
| CN | 105817259 A | 8/2016 |
| CN | 106179461 A | 12/2016 |
| CN | 106179475 A | 12/2016 |
| CN | 106268917 A | 1/2017 |
| CN | 106622357 A | 5/2017 |
| CN | 106669863 A | 5/2017 |
| CN | 107029779 A | 8/2017 |
| EA | 8365 B1 | 4/2007 |
| EA | 27816 B1 | 9/2017 |
| RU | 2158632 C1 | 11/2000 |
| RU | 2190589 C2 | 10/2002 |
| RU | 2331473 C2 | 8/2008 |

OTHER PUBLICATIONS

Mao et al., Machine translation of the claims section of CN 106268917, Jan. 2017, 2 pages.*
Blasco et al., "Hydrothermal stabilization of ZSM-5 catalytic-cracking additives by phosphorus addition", Journal of Catalysis, 237, 2006, pp. 267-277.*
Liu et al., Machine translation of the description section of CN 101759198, Jun. 2010, 6 pages.*
Liu et al., Machine translation of the claims section of CN 101759198, Jun. 2010, 3 pages.*
Wei, Qiang et al.; Synthesis and Characterization of Phosphorous Modified Y Zeolite; ACTA Petrolei Sinica (Petroleum Processiong Section), vol. 27, No. (2), Apr. 30, 2011, pp. 275-279.
Gan, Jun et al.; Studies on silicon-rich USY zeolite modified by phosphorus; Industrial Catalysis; vol. 8 No. 3, May 2000;, pp. 27-29.

* cited by examiner

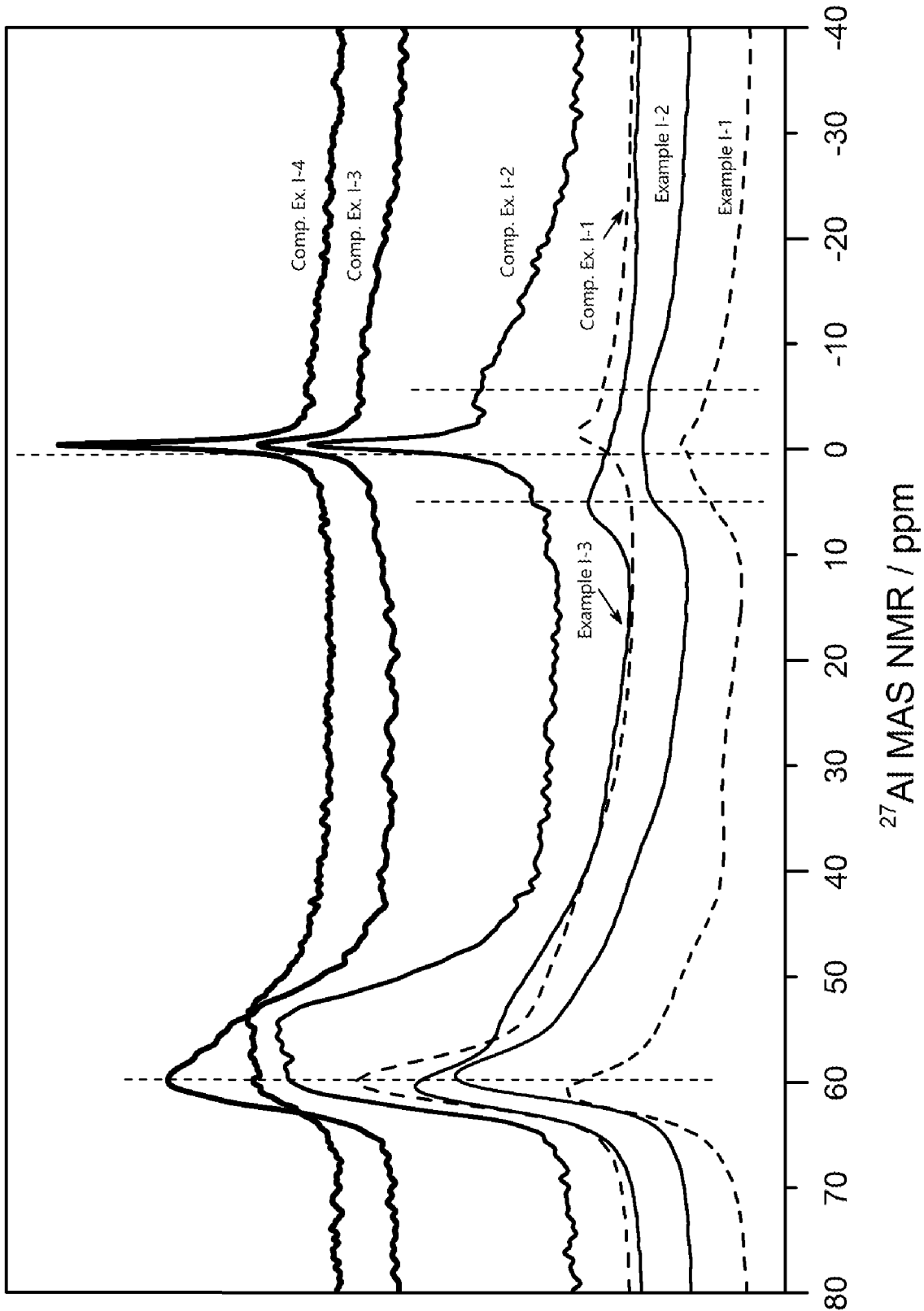

PHOSPHORUS-CONTAINING MOLECULAR SIEVE, ITS PREPARATION AND APPLICATION THEREOF

CROSS REFERENCE TO RELATED APPLICATIONS

This application is a U.S. National Stage Application of PCT International Application PCT/CN2018/111166, filed on Oct. 22, 2018, which claims the priority of Chinese patent application No. 201711046549.4, entitled "phosphorus-containing molecular sieve, its preparation and application thereof," filed on Oct. 31, 2017 with the Chinese patent office, and Chinese patent application No. 201711048395.2, entitled "hydrocracking catalyst, its preparation and application thereof," filed on Oct. 31, 2017 with the Chinese patent office, the contents of which are incorporated herein by reference in their entirety.

TECHNICAL FIELD

The present application relates to the field of molecular sieves, particularly to a phosphorus-containing molecular sieve, its preparation and application thereof.

BACKGROUND ART

Hydrocracking feedstocks in industry comprise fractions having a boiling range of 350-540° C., such as VGO, which contains large quantities of polycyclic aromatic hydrocarbons and cycloalkanes. Research shows that in the high conversion area of hydrocracking, the content of aromatic hydrocarbon in heavy fraction is reduced, and the content of naphthenic hydrocarbon is higher, and thus the ring-opening performance has become an effective means for improving the quality of tail oil and increasing the smoke point of aviation kerosene. However, since the β-bond in cycloalkanes is in the vertical direction of the empty p-orbital of cycloalkane-derived carbonium ion, they cannot easily form a coplanar conformation, so that the ring-opening of cycloalkanes requires more acidity. Molecular sieves have relatively higher acidity and are widely applied to hydrocracking reactions. However, normal HY molecular sieves have an unstable structure, and are susceptible to dealumination of the framework during the preparation and usage of catalysts. Non-framework aluminum generated during the preparation of the molecular sieve is generally weak in acidity, and may shield the B acid center, so that the performance of the catalyst may be reduced. The structure of molecular sieves can be stabilized through ultrastabilization by hydrothermal treatment, introduction of a second component, and the like, wherein the second component to be introduced generally includes an rare earth component and a phosphorus component. Phosphorus may form a phosphorus-aluminum oxide complex having a larger molecular weight with the non-framework aluminum removed from the molecular sieve during the calcining process. Said complex has higher thermal stability and is beneficial to preventing the dealumination of the framework, so that it may play a part of the role of rare earth components.

Chinese patent application publication No. CN1279130A discloses a method for preparing a phosphorus-containing Y-type molecular sieve, which comprises subjecting a P—NH$_4$NaY molecular sieve having a phosphorus content of 0.5-5 wt % (calculated as P$_5$O$_2$), a Na$_2$O content of 0.5-6 wt %, and a lattice constant of 2.460-2.475 nm to hydrothermal roasting at 450-700° C. for 0.5-4 h in a 100% steam atmosphere in a roasting furnace; subjecting the roasted product to liquid-phase dealumination and SiO$_2$ addition; and then filtering and washing to obtain a phosphorus-containing ultrastable Y-type molecular sieve.

Chinese patent application publication No. CN1727280A discloses a phosphorous-containing molecular sieve comprising 85-99.9 wt % of a molecular sieve and about 0.1-15 wt % of phosphorous, calculated as P$_2$O$_5$. In a $^{31}$P MAS-NMR spectrogram of the molecular sieve, the percentage of the peak area of a peak with a chemical shift of 0±1.0 ppm relative to the total peak area is less than 1%. The preparation of the molecular sieve comprises the following steps: introducing phosphorus into the molecular sieve, and washing the molecular sieve with an aqueous solution containing acid, wherein the acid is one or more selected from the group consisting of water-soluble organic acids and inorganic acids, the content of the acid is 0.0001-10.0 mol/L, and the washing temperature is between room temperature and 95° C.

In the prior art, phosphorus-containing molecular sieves are usually subjected to post-treatment to further improve the stability and acidity of the molecular sieves. These post-treatment methods generally include heat treatment and acid leaching.

Currently used heat treatment methods for molecular sieves usually comprise heat treatment and hydrothermal treatment, both of which can remove a certain amount of unstable aluminum species, so that the stability of the molecular sieve can be improved. The silicon oxide in the molecular sieve may form hydrated silicon species at high temperature under hydrothermal conditions, which improves the mobility of the hydrated silicon species, so that the reaction energy barrier difference of 10-30 kJ/mol between desiliconization and dealumination can be overcome, and a balance of dealumination and silicon supplementation can be achieved. Finally, the framework structure of the molecular sieve can be kept more complete. The introduction of water in the hydrothermal treatment can be performed in two modes, namely introducing steam during roasting and releasing water by autogenous roasting of the material. In the two modes, as the temperature exceeds the vaporization temperature of water under the applied pressure, a gas-liquid-solid three-phase reaction will occur in the reaction system, and therefore the desilication reaction may have heterogeneity on a microscopic scale. In addition, the steam pressure increases dramatically due to the volumetric expansion effect of the conversion of liquid to gas, which causes the reaction material of molecular sieve to be carried out of the reaction system during the preparation of molecular sieves. Because of this, the severity of the reaction of molecular sieves may have great non-uniformity depending on the microscopic atmosphere, and finally the distribution of framework aluminum in the molecular sieve becomes uneven, thereby reducing the reactivity thereof.

Although there are some phosphorus-containing molecular sieves and methods for their preparation known in the art, there remains a need for phosphorus-containing molecular sieves that exhibit higher hydrocracking activity and ring-opening selectivity when used in hydrocracking catalysts and methods for preparing such molecular sieves.

SUMMARY OF THE INVENTION

An object of the present application is to provide a phosphorus-containing molecular sieve having a specific combination of characteristics, particularly a high ratio of B acid content to L acid content in combination with other specific characteristics, such that it may exhibit higher hydrocracking activity and ring-opening selectivity when used in the preparation of a hydrocracking catalyst, and the preparation and application of the same. Another object of the present application is to provide a hydrocracking catalyst comprising a phosphorus-containing molecular sieve according to the present application, its preparation and application thereof.

To achieve the above object, in an aspect, the present application provides a phosphorus-containing molecular sieve having a phosphorus content of about 0.3 wt % to about 5 wt % calculated as oxide, a pore volume of about 0.2 ml/g to about 0.95 ml/g, and a ratio of B acid content to L acid content of about 2 to about 10.

Preferably, the 27Al-NMR structural spectrum of the phosphorus-containing molecular sieve has an $I_{60ppm}/I_{-1ppm}$ of about 5 to about 40 and an $I_{-1ppm}/I_{\pm 6ppm}$ of about 0.4 to about 2.

In another aspect, the present application provides a method for preparing a phosphorous-containing molecular sieve, comprising the steps of:

i) subjecting a phosphorus-containing molecular sieve starting material to a hydrothermal treatment;

ii) forming a slurry of the hydrothermally treated molecular sieve, wherein the ratio of the weight of water in the resulted molecular sieve slurry to the dry weight of the phosphorus-containing molecular sieve starting material is in a range of about 14:1 to about 5:1;

iii) subjecting the resulted molecular sieve slurry to an acid treatment; and iv) recovering a solid product, wherein the acid leaching of step iii) is carried out as follows: adding an acid solution into the molecular sieve slurry at a substantially constant rate at a temperature of about 40° C. to about 95° C., wherein the acid solution is added at a rate of about 0.05 mol/h to about 10 mol/h in terms of H⁺ relative to 1 L of the molecular sieve slurry, after the completion of the acid addition, subjecting the resultant to an isothermal reaction for about 0.5 h to about 20 h, wherein the ratio of the weight of the acid in the acid solution to the dry weight of the phosphorus-containing molecular sieve starting material is about 0.01:1 to about 0.6:1.

Preferably, the phosphorus-containing molecular sieve starting material has a phosphorus content of about 0.1 wt % to about 15 wt % and a sodium content of about 0.5 wt % to about 4.5 wt %, calculated as oxides and based on the dry weight of the phosphorus-containing molecular sieve starting material.

Preferably, the phosphorus-containing molecular sieve starting material is a phosphorus-containing Y-type molecular sieve having a lattice constant of 2.425-2.470 nm, a specific surface area of about 250-750 m²/g, and a pore volume of about 0.2-0.95 ml/g.

Preferably, the phosphorus-containing molecular sieve starting material is in the form of particles, and the phosphorus-containing molecular sieve starting material having a particle size of about 1 mm to about 500 mm accounts for about 10 wt % to about 100 wt % of the total weight of the phosphorus-containing molecular sieve starting material, the particle size being the diameter of the circumscribed circle of the particle.

In yet another aspect, the present application provides a phosphorous-containing molecular sieve obtained by the method for preparing a phosphorous-containing molecular sieve according to the present application.

In yet another aspect, the present application provides a hydrocracking catalyst comprising, on a dry basis and based on the weight of the catalyst, from about 45 wt % to about 90 wt % of a support, from about 1 wt % to about 40 wt % of a first metal component, calculated as metal oxide, and from about 1 wt % to about 15 wt % of a second metal component, calculated as metal oxide, wherein:

the support comprises a phosphorus-containing molecular sieve according to the present invention and a refractory inorganic oxide, wherein the weight ratio of the phosphorus-containing molecular sieve to the refractory inorganic oxide is about 0.03:1 to about 20:1; the first metal is a metal of Group VIB; and the second metal is a metal of Group VIII.

Preferably, the refractory inorganic oxide is selected from the group consisting of alumina, silica, amorphous silica-alumina compounds, zirconia, magnesia, thoria, beryllia, boric oxide, cadmium oxide, and combinations thereof; the first metal is molybdenum and/or tungsten; the second metal is selected from the group consisting of iron, nickel, cobalt, and combinations thereof.

In yet another aspect, the present application provides the use of a phosphorus-containing molecular sieve according to the present application in the preparation of hydrocracking catalysts.

In yet another aspect, the present application provides a method for preparing a hydrocracking catalyst, comprising the steps of contacting a support with an impregnation solution containing a metal precursor to perform impregnation, and drying the material obtained after the impregnation, wherein:

the support comprises a phosphorus-containing molecular sieve according to the present application and a refractory inorganic oxide, the metal precursor comprises a first metal precursor and a second metal precursor, the first metal is a metal of Group VIB, and the second metal is a metal of Group VIII;

preferably, the method further comprises the steps of: mixing the phosphorus-containing molecular sieve and the refractory inorganic oxide with a peptizing agent and optionally a lubricant, and then shaping, drying and calcining to obtain the support.

Preferably, the first metal precursor is selected from the group consisting of inorganic acids of the first metal, inorganic salts of the first metal, metal-organic compounds of the first metal, and combinations thereof; wherein the inorganic salt is preferably selected from the group consisting of nitrates, carbonates, hydroxycarbonates, hypophosphites, phosphates, sulfates, chlorides, and combinations thereof; the organic moiety in the metal-organic compound of the first metal is selected from the group consisting of hydroxyl, carboxyl, amino, ketone group, ether group, alkyl, and combinations thereof;

the second metal precursor is selected from the group consisting of inorganic acids of the second metal, inorganic salts of the second metal, metal-organic compounds of the second metal, and combinations thereof; wherein the inorganic salt is selected from the group consisting of nitrates, carbonates, hydroxycarbonates, hypophosphites, phosphates, sulfates, chlorides, and combinations thereof; the organic moiety in the metal-organic compound of the second metal is selected from the group consisting of hydroxyl, carboxyl, amino, ketone group, ether group, alkyl, and combinations thereof.

In a further aspect, the present application provides the use of a phosphorus-containing molecular sieve according to the present application or a hydrocracking catalyst according to the present application in the hydrocracking of hydrocarbon feedstocks.

In yet another aspect, the present application provides a process for hydrocracking a hydrocarbon feedstock, comprising the step of hydrocracking the hydrocarbon feedstock in the presence of a phosphorus-containing molecular sieve according to the present application or a hydrocracking catalyst according to the present application.

In the present application, the phosphorus-containing molecular sieve starting material is subjected to a special treatment to produce a phosphorus-containing molecular sieve with excellent performance, and the phosphorus-containing molecular sieve has a specific combination of characteristics, particularly a high ratio of B acid content to L acid content in combination with other specific characteristics. Compared with existing phosphorus-containing molecular sieves, the phosphorus-containing molecular sieve according to the present application shows higher hydrocracking activity and ring-opening selectivity when used in the preparation of hydrocracking catalysts. Correspondingly, the hydrocracking catalyst derived from the phosphorus-containing molecular sieve shows higher hydrocracking activity and ring-opening selectivity when used in hydrocracking reactions.

Other characteristics and advantages of the present application will be described in detail in the Detailed Description section below.

BRIEF DESCRIPTION OF THE DRAWINGS

The drawings, forming a part of the present description, are provided to help the understanding of the present application, and should not be considered to be limiting. The present application can be interpreted with reference to the drawings in combination with the embodiments described hereinbelow. In the drawings:

FIG. 1 is a 27Al-NMR structural spectrum of the molecular sieves obtained in Examples I-1 to I-3 and Comparative Examples I-1 to I-4.

DETAILED DESCRIPTION OF THE INVENTION

The present application will be further described hereinafter in detail with reference to embodiments thereof and the accompanying drawings. It should be noted that the embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to those skilled in the art that such a combination is obviously unreasonable.

Unless otherwise stated, all pressures provided herein are gauge pressures.

Unless otherwise stated, all particle sizes provided herein refer to the diameter of the circumscribed circle of the particle.

As used herein, the term "phosphorus-containing molecular sieve starting material" refers to a phosphorus-containing molecular sieve used as a starting material. In the present application, as a phosphorus-containing molecular sieve starting material is used, phosphorus-aluminum species outside the molecular sieve framework can improve the framework stability of the molecular sieve, thereby further improving the performance of the molecular sieve.

As used herein, the term "substantially constant rate" means substantially continuously adding the acid solution to the molecular sieve slurry at a substantially constant rate until the amount by weight of the acid in the acid solution added reaches a pre-determined value, wherein the term "substantially continuously adding" means continuously adding till the completion of the addition, or adding intermittently in multiple times with each time of addition being conducted in a continuous manner. By adding the acid in a substantially continuous manner, the addition of the acid and the acid leaching reaction can be conducted at the same time, and the acid can be added in a lower rate, which makes the dealuminization process more mild, and thus is beneficial to improving the performance of the molecular sieve.

Particularly, in the context of the present application, the expression "adding the acid solution to the molecular sieve slurry at a substantially constant rate" covers the case where the acid solution is continuously added to the molecular sieve slurry at a substantially constant rate until a predetermined amount of the acid solution is added at one time; and also covers the case where the acid solution is added to the molecular sieve slurry in multiple times, with the acid solution being continuously added at a substantially constant rate during each time of addition, wherein the resulted mixture may be subjected to an isothermal reaction (i.e. a reaction under a constant temperature) for a period of time after each time of acid addition, and then a next acid addition may be performed until a pre-determined amount of the acid solution is added. The rate of addition of the acid solution during each addition may be the same or different and is independently from about 0.05 mol/h to about 10 mol/h, preferably from about 0.2 mol/h to about 3.0 mol/h.

All patent and non-patent documents cited herein, including but not limited to textbooks and journal articles and the like, are incorporated herein by reference in their entirety.

In a first aspect, the present application provides a phosphorus-containing molecular sieve having a phosphorus content of about 0.3 wt % to about 5 wt %, preferably about 0.4 wt % to about 2.0 wt %, calculated as oxide, a pore volume of about 0.2 ml/g to about 0.95 ml/g, preferably about 0.25 ml/g to about 0.60 ml/g, and a ratio of B acid content to L acid content of about 2 to about 10, preferably about 3.4 to about 9.5.

The phosphorus-containing molecular sieve according to the present application has a higher ratio of B acid content to L acid content. Particularly, the phosphorus-containing molecular sieve according to the present application retains not only a high ratio of framework aluminum to non-framework aluminum, but also a certain amount of non-framework aluminum, such as at the position with a chemical shift of −4 ppm to −6 ppm or a chemical shift of 3 ppm to 7 ppm. Particularly, the molecular sieve has a $^{27}$Al-NMR structural spectrum in which the ratio of the peak height of framework aluminum at 60±1 ppm to the peak height of non-framework aluminum at −1±1 ppm, i.e., $I_{60ppm}/I_{-1ppm}$, is from about 5 to about 40, preferably from about 10.0 to about 39; and there are two distinct characteristic peaks of non-framework aluminum, with one being at −1±1 ppm, and the other being at −5.5±2 ppm or 3-7 ppm. The ratio of peak heights of the two characteristic peaks, i.e. $I_{-1ppm}/I_{\pm 6ppm}$, is about 0.4 to about 2, preferably about 0.8 to about 2, wherein the $I_{\pm 6ppm}$ represents the larger one of the peak heights at −5.5±2 ppm and 3-7 ppm.

In a preferred embodiment, the phosphorus-containing molecular sieve according to the present application has a lattice constant of 2.425-2.470 nm, preferably 2.430-2.458 nm, and a specific surface area of about 250-850 m$^2$/g, preferably about 400-750 m$^2$/g.

In a preferred embodiment, the phosphorus-containing molecular sieve according to the present application is a molecular sieve having a faujasite structure, preferably a Y-type molecular sieve, more preferably a molecular sieve selected from the group consisting of NaY, HNaY, REY, USY molecular sieves, and combinations thereof.

In a preferred embodiment, the cation site of the phosphorus-containing molecular sieve according to the present application is occupied by one or more of sodium ion, ammonium ion, and hydrogen ion.

In a particularly preferred embodiment, the phosphorus-containing molecular sieve according to the present application is prepared by a method comprising the steps of: i) subjecting a phosphorus-containing molecular sieve starting material to a hydrothermal treatment;

ii) forming a slurry of the hydrothermally treated molecular sieve, wherein the ratio of the weight of water in the resulted molecular sieve slurry to the dry weight of the phosphorus-containing molecular sieve starting material is in a range of about 14:1 to about 5:1;

iii) subjecting the resulted molecular sieve slurry to acid leaching; and iv) recovering a solid product, wherein the acid leaching of step iii) is carried out as follows: adding an acid solution to the molecular sieve slurry at a substantially constant rate at a temperature of about 40° C. to about 95° C., preferably about 50° C. to about 85° C., wherein the acid solution is added at a rate of about 0.05 mol/hr to about 10 mol/hr, preferably about 0.2 mol/hr to about 3.0 mol/hr, calculated on the basis of H$^+$ relative to 1 L of the molecular sieve slurry, and subjecting the resultant to an isothermal reaction, after the completion of the acid addition, for about 0.5 h to about 20 h, preferably about 0.5 h to about 15 h, wherein the ratio of the weight of the acid in the acid solution to the dry weight of the phosphorus-containing molecular sieve starting material is about 0.01:1 to about 0.6:1.

In a further preferred embodiment, the phosphorus-containing molecular sieve starting material may have a faujasite molecular sieve structure, and is preferably a phosphorus-containing Y-type molecular sieve, which may have a lattice constant of 2.425-2.470 nm, preferably 2.440-2.470 nm, a specific surface area of about 250-750 m$^2$/g, preferably about 400-700 m$^2$/g, and a pore volume of about 0.2 ml/g to about 0.95 ml/g, preferably about 0.2 ml/g to about 0.5 ml/g. Further, the selection of the Y-type molecular sieve may be widely varied as long as the phosphorus-containing molecular sieve starting material meets the above requirements. For example, the Y-type molecular sieve may be selected from the group consisting of NaY, HNaY (hydrogen Y-type molecular sieve), REY (rare earth Y-type molecular sieve), USY (ultrastable Y-type molecular sieve), and the like. The cation site of the phosphorus-containing Y-type molecular sieve may be occupied by one or more of sodium ion, ammonium ion and hydrogen ion; or alternatively, the sodium, ammonium, and hydrogen ions in the molecular sieve may be replaced, fully or partially, by other ions via conventional ion exchange before or after the introduction of phosphorus into the molecular sieve. The phosphorus-containing molecular sieve starting material can be a commercial product, and may also be prepared by any method described in the prior art, such as the method for preparing USY disclosed in Chinese patent application publication No. CN1350886A, or the method for preparing PUSY disclosed in Chinese patent application publication No. CN1727280A, and the like, which will not be described in detail herein.

In a further preferred embodiment, the phosphorus-containing molecular sieve starting material has a water content of about 10 wt % to about 40 wt %. Phosphorus-containing molecular sieve starting materials having such a water content can be obtained by adding water into an initial molecular sieve starting material, slurrying, and then filtering and drying. Further, the phosphorus-containing molecular sieve starting material is preferably in the form of particles, and the phosphorus-containing molecular sieve starting material having a particle size of about 1 mm to about 500 mm may account for about 10 wt % to about 100 wt %, preferably about 30 wt % to about 100 wt % of the total weight of the phosphorus-containing molecular sieve starting material. Still further, the phosphorus-containing molecular sieve starting material having a particle size of about 5 mm to about 100 mm may account for about 30 wt % to about 100 wt % of the total weight of the phosphorus-containing molecular sieve starting material. The use of a phosphorus-containing molecular sieve starting material with the above described particle size in the hydrothermal treatment can substantively improve the mass transfer efficiency of the hydrothermal treatment, reduce the material loss and improve the stability of operation. The particle size of the molecular sieve starting material can be controlled by a conventional method in the art, such as sieving method, band extrusion method, rolling ball method and the like.

In a further preferred embodiment, the hydrothermal treatment of step i) is carried out in the presence of steam, preferably in the presence of 30% to 100% of steam, under the following conditions: a temperature of about 350-700° C., a pressure of about 0.1-2 MPa, and a hydrothermal treatment time of about 0.5-10 h.

In a further preferred embodiment, the molecular sieve slurry is obtained in step ii) by forming a slurry of the hydrothermally treated molecular sieve material with water, wherein the expression "forming a slurry with water" has the meaning well known to those skilled in the art, and the ratio of the weight of water in the molecular sieve slurry obtained after slurrying to the dry weight of the phosphorus-containing molecular sieve starting material may be in a range of about 14:1 to about 5:1.

In some further preferred embodiments, in step iii), the acid solution is added to the molecular sieve slurry at substantially constant rate in one time, i.e., continuously added at a pre-determined rate until all of the acid solution has been added, and then the resultant is subjected to an isothermal reaction, i.e. a reaction at a constant temperature.

In some other further preferred embodiments, in order to improve the utilization of the material and reduce the waste production, the acid solution is added in multiple times, in which the acid solution is continuously added into the molecular sieve slurry at a pre-determined rate during each time of addition, the resultant is subjected to an isothermal reaction for a period of time after each addition, and then a next acid addition is carried out until a pre-determined amount of the acid solution is added completely. For example, the acid solution may be added in 2 to 10 times, and the acid solution may be added at a substantially constant rate in a range of about 0.05 mol/h to about 10 mol/h, preferably about 0.2 mol/h to about 3.0 mol/h, each time, calculated on the basis of $H^+$ relative to 1 L of the molecular sieve slurry, and the resultant is subjected to an isothermal reaction for a period of time after each addition such that the total isothermal reaction time is about 0.5-20 hours, preferably about 0.5-15 hours. Preferably, when the acid solution is added in multiple times, the ratio of the weight of acid in the acid solution to the dry weight of the phosphorus-containing molecular sieve starting material is about 0.01:1 to about 0.3:1.

In a further preferred embodiment, the acid solution may have an acid concentration of about 0.01 mol/L to about 15.0 mol/L, preferably about 0.02 mol/L to about 5.0 mol/L, and a pH of about 0.01 to about 3. The acid may be a conventional inorganic acid and/or organic acid, and may for example be selected from the group consisting of phosphoric acid, sulfuric acid, nitric acid, hydrochloric acid, acetic acid, citric acid, tartaric acid, formic acid, acetic acid, and combinations thereof.

In a further preferred embodiment, in step iii), an ammonium salt may also be added to the molecular sieve slurry during the addition of the acid solution. For example, the ammonium salt may be selected from the group consisting of ammonium nitrate, ammonium chloride, ammonium sulfate, and combinations thereof. Preferably, the ratio of the weight of the ammonium salt to the dry weight of the phosphorus-containing molecular sieve starting material may be in a range of about 0.1:1 to about 2.0:1. The ammonium salt may be added to the molecular sieve slurry separately from the acid solution, or the ammonium salt and the acid may be prepared into an aqueous solution in a desired amount and then added to the molecular sieve slurry in the form of the aqueous solution.

In a further preferred embodiment, after step iv), the recovered solid product is washed with water and dried to obtain the phosphorus-containing molecular sieve. The water washing and drying are conventional steps for preparing molecular sieves, and there is no particular limitation in the present application. For example, the drying may be carried out by oven drying, mesh belt drying, heating with a rotating furnace, and the like, and conditions for the drying may include: a temperature of about 50-350° C., preferably about 70-200° C.; a drying time of about 1-24 hours, preferably about 2-6 hours.

In a particularly preferred embodiment, the phosphorus-containing molecular sieve according to the present application can be prepared by a method comprising the steps of:

i) subjecting a phosphorus-containing molecular sieve starting material to a hydrothermal treatment in the presence of steam, preferably in the presence of 30-100% of steam, at a temperature of about 350-700° C. and a pressure of about 0.1-2 MPa for about 0.5-10 h to obtain a hydrothermally treated molecular sieve material;

ii) forming a slurry of the hydrothermally treated molecular sieve material with water to obtain a molecular sieve slurry, wherein the ratio of the weight of water in the molecular sieve slurry to the dry weight of the phosphorus-containing molecular sieve starting material is about 14:1 to about 5:1;

iii) heating the molecular sieve slurry to a temperature of about 40-95° C., preferably about 50-85° C., and then maintaining at the temperature and adding an acid solution to the molecular sieve slurry at a substantially constant rate, wherein the ratio of the weight of the acid in the acid solution to the dry weight of the phosphorus-containing molecular sieve starting material is in a range of about 0.01:1 to about 0.6:1, calculated on the basis of $H^+$ relative to 1 L of the molecular sieve slurry, wherein the acid solution is added at a rate of about 0.05 mol/h to about 10 mol/h, preferably about 0.2-3.0 mol/h, and subjecting the resultant to an isothermal reaction for about 0.5 h to about 20 h, preferably about 0.5-15 h after the completion of the acid addition; and iv) recovering a solid product.

In a second aspect, the present application provides a method for preparing a phosphorous-containing molecular sieve, comprising the steps of:

i) subjecting a phosphorus-containing molecular sieve starting material to a hydrothermal treatment;

ii) forming a slurry of the hydrothermally treated molecular sieve, wherein the ratio of the weight of water in the resulted molecular sieve slurry to the dry weight of the phosphorus-containing molecular sieve starting material is in a range of about 14:1 to about 5:1;

iii) subjecting the resulted molecular sieve slurry to acid leaching; and iv) recovering a solid product, wherein the acid leaching of step iii) is carried out as follows: adding an acid solution to the molecular sieve slurry at a substantially constant rate at a temperature of about 40° C. to about 95° C., preferably about 50° C. to about 85° C., wherein the acid solution is added at a rate of about 0.05 mol/hr to about 10 mol/hr, preferably about 0.2 mol/hr to about 3.0 mol/hr, calculated on the basis of $H^+$ relative to 1 L of the molecular sieve slurry, and subjecting the resultant to an isothermal reaction, after the completion of the acid addition, for about 0.5 h to about 20 h, preferably about 0.5 h to about 15 h, wherein the ratio of the weight of the acid in the acid solution to the dry weight of the phosphorus-containing molecular sieve starting material is about 0.01:1 to about 0.6:1.

In a preferred embodiment, the phosphorus-containing molecular sieve starting material may have a faujasite molecular sieve structure, and is preferably a phosphorus-containing Y-type molecular sieve, which may have a lattice constant of 2.425-2.470 nm, preferably 2.440-2.470 nm, a specific surface area of about 250-750 $m^2/g$, preferably about 400-700 $m^2/g$, and a pore volume of about 0.2 ml/g to about 0.95 ml/g, preferably about 0.2 ml/g to about 0.5 ml/g. Further, the selection of the Y-type molecular sieve may be widely varied as long as the phosphorus-containing molecular sieve starting material meets the above requirements. For example, the Y-type molecular sieve may be selected from the group consisting of NaY, HNaY (hydrogen Y-type molecular sieve), REY (rare earth Y-type molecular sieve), USY (ultrastable Y-type molecular sieve), and the like. The cation site of the phosphorus-containing Y-type molecular sieve may be occupied by one or more of sodium ion, ammonium ion and hydrogen ion; or alternatively, the sodium, ammonium, and hydrogen ions in the molecular sieve may be replaced, fully or partially, by other ions via conventional ion exchange before or after the introduction of phosphorus into the molecular sieve. The phosphorus-containing molecular sieve starting material can be a commercial product, and may also be prepared by any method described in the prior art, such as the method for preparing USY disclosed in Chinese patent application publication No. CN1350886A, or the method for preparing PUSY disclosed in Chinese patent application publication No. CN1727280A, and the like, which will not be described in detail herein.

In a preferred embodiment, the phosphorus-containing molecular sieve starting material has a water content of about 10 wt % to about 40 wt %. Phosphorus-containing molecular sieve starting materials having such a water content can be obtained by adding water into an initial molecular sieve starting material, slurrying, and then filtering and drying. Further, the phosphorus-containing molecular sieve starting material is preferably in the form of particles, and the phosphorus-containing molecular sieve starting material having a particle size of about 1 mm to about 500 mm may account for about 10 wt % to about 100 wt %, preferably about 30 wt % to about 100 wt %, of the total weight of the phosphorus-containing molecular sieve starting material. Still further, the phosphorus-containing molecular sieve starting material having a particle size of about 5 mm to about 100 mm may account for about 30 wt % to about 100 wt % of the total weight of the phosphorus-containing molecular sieve starting material. The use of a phosphorus-containing molecular sieve starting material with the above described particle size in the hydrothermal treatment can substantively improve the mass transfer efficiency of the hydrothermal treatment, reduce the material loss and improve the stability of operation. The particle size of the molecular sieve starting material can be controlled by a conventional method in the art, such as sieving method, band extrusion method, rolling ball method and the like.

In a preferred embodiment, the hydrothermal treatment of step i) is carried out in the presence of steam, preferably in the presence of 30% to 100% of steam, under the following conditions: a temperature of about 350-700° C., a pressure of about 0.1-2 MPa, and a hydrothermal treatment time of about 0.5-10 h.

In a preferred embodiment, the molecular sieve slurry is obtained in step ii) by forming a slurry of the hydrothermally treated molecular sieve material with water, wherein said "forming a slurry with water" has the meaning well known to those skilled in the art, and the ratio of the weight of water in the molecular sieve slurry obtained after slurrying to the dry weight of the phosphorus-containing molecular sieve starting material may be about 14:1 to about 5:1.

In some embodiments, in step iii), the acid solution is added to the molecular sieve slurry at substantially constant rate in one time, i.e., continuously added at a pre-determined rate until all of the acid solution is added, and then the resultant is subjected to an isothermal reaction.

In some other embodiments, in order to improve the utilization rate of materials and reduce waste production, the acid solution is added in multiple times, in which the acid solution is continuously added into the molecular sieve slurry at a pre-determined rate during each time of addition, the resultant is subjected to an isothermal reaction for a period of time after each addition, and then a next addition is performed, until a pre-determined amount of the acid solution is added. For example, the acid solution may be added in 2-10 times, and the acid solution may be added at a substantially constant rate in a range of about 0.05 mol/h to about 10 mol/h, preferably about 0.2 mol/h to about 3.0 mol/h, calculated on the basis of $H^+$ relative to 1 L of the molecular sieve slurry each time, and the resultant is subjected to an isothermal reaction for a period of time after each addition such that the total isothermal reaction time is about 0.5-20 hours, preferably about 0.5-15 hours. Preferably, when the acid solution is added in multiple times, the ratio of the weight of acid in the acid solution to the dry weight of the phosphorus-containing molecular sieve starting material is about 0.01:1 to about 0.3:1.

In a preferred embodiment, the acid solution may have an acid concentration of about 0.01 mol/L to about 15.0 mol/L, preferably about 0.02 mol/L to about 5.0 mol/L, and a pH of about 0.01 to about 3. The acid may be a conventional inorganic acid and/or organic acid, and may for example be selected from the group consisting of phosphoric acid, sulfuric acid, nitric acid, hydrochloric acid, acetic acid, citric acid, tartaric acid, formic acid, acetic acid, and combinations thereof.

In a preferred embodiment, the method according to the present application may further comprise, in step iii), adding an ammonium salt to the molecular sieve slurry during the addition of the acid solution. For example, the ammonium salt may be selected from the group consisting of ammonium nitrate, ammonium chloride, ammonium sulfate, and combinations thereof. Preferably, the ratio of the weight of the ammonium salt to the dry weight of the phosphorus-containing molecular sieve starting material may be in a range of about 0.1:1 to about 2.0:1. The ammonium salt may be added to the molecular sieve slurry separately from the acid solution, or the ammonium salt and the acid may be prepared into an aqueous solution in a desired amount and then added to the molecular sieve slurry in the form of the aqueous solution.

In a preferred embodiment, the method according to the present application may further comprise, after step iv), subjecting the recovered solid product to water washing and drying to obtain the phosphorus-containing molecular sieve. The water washing and drying are conventional steps for preparing molecular sieves, and there is no particular limitation in the present application. For example, the drying may be carried out by oven drying, mesh belt drying, heating with a rotating furnace, and the like, and conditions for the drying may include: a temperature of about 50-350° C., preferably about 70-200° C.; a drying time of about 1-24 hours, preferably about 2-6 hours.

In a particularly preferred embodiment, the method according to the present application comprises the steps of:

i) subjecting a phosphorus-containing molecular sieve starting material to a hydrothermal treatment in the presence of steam, preferably in the presence of 30-100% of steam, at a temperature of about 350-700° C. and a pressure of about 0.1-2 MPa for about 0.5-10 h to obtain a hydrothermally treated molecular sieve material;

ii) forming a slurry of the hydrothermally treated molecular sieve material with water to obtain a molecular sieve slurry, wherein the ratio of the weight of water in the molecular sieve slurry to the dry weight of the phosphorus-containing molecular sieve starting material is about 14:1 to about 5:1;

iii) heating the molecular sieve slurry to a temperature of about 40-95° C., preferably about 50-85° C., and then maintaining at the temperature and adding an acid solution to the molecular sieve slurry at a substantially constant rate, wherein the ratio of the weight of the acid in the acid solution to the dry weight of the phosphorus-containing molecular sieve starting material is in a range of about 0.01:1 to about 0.6:1, calculated on the basis of $H^+$ relative to 1 L of the molecular sieve slurry, wherein the acid solution is added at a rate of about 0.05 mol/h to about 10 mol/h, preferably about 0.2-3.0 mol/h, and subjecting the resultant to an isothermal reaction for about 0.5 h to about 20 h, preferably about 0.5-15 h after the completion of the acid addition; and iv) recovering a solid product.

In a third aspect, the present application provides a phosphorous-containing molecular sieve obtained by the method for preparing a phosphorous-containing molecular sieve according to the present application.

By processing a phosphorus-containing molecular sieve starting material in a special manner, a phosphorus-containing molecular sieve with excellent performance can be obtained, which shows higher hydrocracking activity and ring-opening selectivity when used in the preparation of hydrocracking catalysts.

The phosphorus-containing molecular sieve according to the present application is suitable for use in various catalysts with acid catalytic activity for reactions such as catalytic cracking, hydroisomerization, alkylation, hydrocracking and the like, and is particularly suitable for the hydrocracking of hydrocarbon feedstocks to produce a hydrocarbon fraction with a lower boiling point and a lower molecular weight.

In a fourth aspect, the present application provides a hydrocracking catalyst comprising, on a dry basis and based on the weight of the catalyst, from about 45 wt % to about 90 wt %, preferably from about 55 wt % to about 85 wt %, of a support, from about 1 wt % to about 40 wt %, preferably from about 12 wt % to about 35 wt %, calculated as metal oxide, of the first metal component, and from about 1 wt % to about 15 wt %, preferably from about 2 wt % to about 10 wt %, calculated as metal oxide, of the second metal component, wherein:

the support comprises a phosphorus-containing molecular sieve according to the present application as described above and a refractory inorganic oxide, wherein the weight ratio of the phosphorus-containing molecular sieve to the refractory inorganic oxide is about 0.03:1 to about 20:1, preferably about 0.03:1 to about 6:1; the first metal is a metal of Group VIB; and the second metal is a metal of Group VIII.

In the hydrocracking catalyst according to the present application, the refractory inorganic oxide can enhance the strength of the catalyst, and improve and adjust the physicochemical properties of the catalyst, for example, improve the pore structure of the catalyst. The refractory inorganic oxide suitable for use in the present application includes inorganic oxides commonly used in the support of hydrogenation catalysts, such as alumina, silica, amorphous silica-alumina compounds, zirconia, magnesia, thoria, beryllia, boric oxide, cadmium oxide, and the like. In some preferred embodiments, the refractory inorganic oxide can be alumina, including hydrargillite, such as gibbsite, bayerite, nordstrandite, and monohydrate-diaspore, such as boehmite, diaspor, pseudoboehmite. In other embodiments, the refractory inorganic oxide can be of other kinds or combinations.

In a preferred embodiment, the first metal may be molybdenum and/or tungsten; and the second metal may be selected from the group consisting of iron, nickel, cobalt, and combinations thereof.

In a fifth aspect, the present application provides the use of a phosphorus-containing molecular sieve according to the present invention in the preparation of a hydrocracking catalyst.

In a sixth aspect, the present application provides a method for preparing a hydrocracking catalyst, comprising the steps of contacting a support with an impregnation solution containing a metal precursor for impregnation, and drying the material obtained after impregnation, wherein:

the support comprises a phosphorus-containing molecular sieve according to the present application and a refractory inorganic oxide as described above, preferably, the weight ratio of the phosphorus-containing molecular sieve to the refractory inorganic oxide is about 0.03:1 to about 20:1, preferably about 0.03:1 to about 6:1; and the metal precursor comprises a first metal precursor and a second metal precursor, wherein the first metal is a metal of Group VIB, and the second metal is a metal of Group VIII.

In the present application, the contacting and impregnation of the support with the impregnation solution may be carried out in accordance with any method known in the art, such as the method disclosed in Chinese patent application publication No. CN101757931A for loading the Group VIB metal component, the Group VIII metal component and the organic additive onto the catalyst support, wherein the loading of the Group VIB metal component, the Group VIII metal component and the organic additive onto the catalyst support is carried out in any of the following manner:

a first manner: contacting the catalyst support with a first solution and then with a second solution, or contacting the catalyst support with a second solution and then with the first solution, wherein the first solution contains a compound of a Group VIB metal component and a compound of a Group VIII metal component, the second solution contains a compound of a Group VIB metal component but does not contain any compound of a Group VIII metal component, and the first solution and/or the second solution contain the organic additive;

a second manner: contacting the catalyst support with a third solution and then with a fourth solution, or contacting the catalyst support with a fourth solution and then with a third solution, wherein the third solution contains a compound of a Group VIB metal component, the fourth solution contains a compound of a Group VIII metal component and an organic auxiliary agent but does not contain any compound of the Group VIB metal component, and the third solution may or may not contain a compound of the Group VIII metal component and the organic additive, wherein, after each contacting, the catalyst support obtained after the contact is heated.

The support used in the catalyst according to the present application may be prepared by a method well known to those skilled in the art, and there is no particular limitation in the present application. For example, the support may be obtained by mixing a phosphorus-containing Y-type molecular sieve, a refractory inorganic oxide, a solvent and optionally an auxiliary agent, followed by shaping and drying. The shaping can be performed by various conventional methods, such as tabletting method, rolling ball method or band extrusion method. The solvent can be a solvent commonly used in the forming process of catalysts. When an extrusion method is used, an appropriate amount of an auxiliary agent is preferably added to facilitate the shaping.

Preferably, the support may be prepared by a method comprising the following steps: mixing a phosphorus-containing Y-type molecular sieve, a refractory inorganic oxide, a peptizing agent and optionally a lubricant, and then shaping, drying and calcining to obtain the support. The peptizing agent can be an acid-containing solution or a alkali-containing solution, wherein the acid can be selected from the group consisting of organic acids and inorganic acids familiar to those skilled in the art, and combinations thereof, such as phosphoric acid, sulfuric acid, nitric acid, hydrochloric acid, acetic acid, tungsten- and/or molybdenum-containing heteropolyacids, citric acid, tartaric acid, formic acid, and acetic acid, and combinations thereof, and cations, such as ammonium, iron, cobalt, nickel, and aluminum ions, helpful for keeping the acidity of the acid-containing solution may also be added to the solution; and the alkali-containing solution may comprise at least one of ammonia, organic amines, and urea.

The shape of the support is not particularly limited in the present application, and may be spherical, strip-shaped, hollow strip-shaped, spherical, block-shaped, etc., and the strip-shaped support may be multiple-leaf-clover shaped, such as three-leaf-clover shaped, four-leaf-clover shaped, or variants thereof.

In an alternative embodiment of the present application, the support may be prepared in accordance with the method disclosed in Chinese patent application publication No. CN107029779A, which comprises: (1) mixing a phosphorus-containing Y-type molecular sieve with a refractory inorganic oxide, a peptizing agent, a lubricant and water to obtain a mixture, wherein the components are used in such amounts that the ratio of the amount by mole of the peptizing agent in the mixture to the weight of powders is $0.28 \times 10^{-4}$ mol/g to $4.8 \times 10^{-4}$ mol/g, and the ratio of the weight of water to the amount by mole of the peptizing agent is $2.0 \times 10^3$ g/mol to $30 \times 10^3$ g/mol, with the weight of powders being the total weight of the phosphorus-containing Y-type molecular sieve and the refractory inorganic oxide, and the amount by mole of the peptizing agent being the mole number of H protons in the peptizing agent; the lubricant is one or two of sesbania powder and graphite; and (2) kneading, shaping, drying and calcining the mixture obtained in the step (1) to obtain the support.

According to the present application, the metal precursor comprises a first metal precursor and a second metal precursor, wherein the first metal precursor is a soluble compound containing the first metal, including inorganic acids of the first metal, inorganic salts of the first metal, and metal-organic compounds of the first metal, and combinations thereof; wherein the inorganic salt may be selected from the group consisting of nitrates, carbonates, hydroxycarbonates, hypophosphites, phosphates, sulfates, chlorides, and combinations thereof; the organic moiety in the metal-organic compound of the first metal may be selected from the group consisting of hydroxyl, carboxyl, amino, ketone group, ether group, alkyl, and combinations thereof. For example, when the first metal is molybdenum, the first metal precursor may be selected from the group consisting of molybdic acid, paramolybdic acid, molybdate, paramolybdate, and combinations thereof; when the first metal is tungsten, the first metal precursor may be selected from the group consisting of tungstic acid, metatungstic acid, ethyl metatungstic acid, tungstate, metatungstate, ethyl metatungstate, and combinations thereof. The second metal precursor is a soluble compound containing the second metal, including inorganic acids of the second metal, inorganic salts of the second metal, and metal-organic compounds of the second metal, and combinations thereof; wherein the inorganic salt may be selected from the group consisting of nitrates, carbonates, hydroxycarbonates, hypophosphites, phosphates, sulfates, chlorides, and combinations thereof; the organic moiety in the metal-organic compound of the second metal may be selected from the group consisting of hydroxyl, carboxyl, amino, ketone group, ether group, alkyl, and combinations thereof.

According to the present application, the impregnation solution may also comprise an organic additive; and the concentration of the organic additive may be about 2-300 g/L. The organic additive may be an oxygen-containing organic compound and/or a nitrogen-containing organic compound. For example, the oxygen-containing organic compound may be selected from the group consisting of ethylene glycol, glycerol, polyethylene glycol (which may have a molecular weight of 200-1500), diethylene glycol, butanediol, acetic acid, maleic acid, oxalic acid, nitrilotriacetic acid, 1,2-cyclohexanediaminetetraacetic acid, citric acid, tartaric acid, and malic acid, and combinations thereof; the nitrogen-containing organic compound may be selected from the group consisting of ethylenediamine, diethylenetriamine, cyclohexanediaminetetraacetic acid, glycine, nitrilotriacetic acid, ethylenediaminetetraacetic acid, ammonium ethylenediaminetetraacetate, and combinations thereof.

In the method for preparing a hydrocracking catalyst according to the present application, the temperature of the contact and impregnation is not particularly limited, and may be any temperature that can be reached by the impregnation solution. The time for the impregnation is also not particularly limited as long as the catalyst support can be loaded with a desired amount of the metal active component precursor. In general, the higher the impregnation temperature and the higher the concentration of the impregnation solution, the shorter the time required to achieve the same impregnation amount (i.e., the weight difference between the catalyst support after impregnation and the catalyst support before impregnation); and vice versa. Where the desired impregnation amount and impregnation conditions have been determined, one skilled in the art can readily select an appropriate impregnation time based on the teachings herein. The impregnation method is not particularly limited in the present application, and the impregnation may be either saturation impregnation or supersaturation impregnation. The environment for the impregnation is not particularly limited, and the impregnation may be performed in a sealed environment or in an open environment according to conventional methods in the art, and the loss of the aqueous solvent may or may not be compensated during the impregnation. Various gases, such as air, nitrogen, steam, etc., may be introduced, or no new component is introduced, during the impregnation.

In the method for preparing a hydrocracking catalyst according to the present application, the conditions for drying the impregnated material are not particularly limited, and various drying conditions commonly used in the art may be adopted, for example: a temperature of about 80-350° C., preferably about 100-300° C., and a drying time of about 0.5-24 h, preferably about 1-12 h.

The method for preparing a hydrocracking catalyst according to the present application may further comprise a step of drying the contacted material and then calcining, where the calcining is a conventional step for preparing catalysts, and is not particularly limited in the present application. Conditions for the calcining may include, for example: a temperature of about 350-600° C., preferably 400-550° C.; a calcining time of about 0.2-12 hours, preferably 1-10 hours.

The hydrocracking catalyst according to the present application can be used as various acid catalytic catalysts for catalytic cracking, hydroisomerization, alkylation, hydrocracking and other reactions, and is particularly suitable for the hydrocracking of hydrocarbon feedstocks to produce a hydrocarbon fraction with a lower boiling point and a lower molecular weight.

In a seventh aspect, the present application provides the use of a phosphorus-containing molecular sieve or hydrocracking catalyst according to the present application in the hydrocracking of hydrocarbon feedstocks.

In an eighth aspect, the present application provides a process for hydrocracking a hydrocarbon feedstock, comprising the step of hydrocracking the hydrocarbon feedstock in the presence of a phosphorus-containing molecular sieve or hydrocracking catalyst according to the present application.

The hydrocarbon feedstock suitable for use in the present application may be various heavy mineral oils or synthetic oils, or their mixed distillates, such as straight run gas oils, vacuum gas oils, demetalized oils, atmospheric residues, deasphalted vacuum residues, coker distillates, catalytic cracker distillates, shale oils, tar sand oils, coal liquefied oils (coal liquid), and the like. Particularly, the hydrocracking catalyst according to the present application is suitable for the hydrocracking of heavy and inferior distillate oils to produce a middle distillate having a distillation range of 149-371° C., particularly 180-370° C.

In the present application, the hydrocracking reaction may be carried out in any reaction apparatus that allows a hydrocarbon feedstock to contact and react with the catalyst under hydrogenation reaction conditions, for example, in one or more of conventional hydrocracking apparatuses such as fixed bed reactors, moving bed reactors, ebullating bed reactors, slurry bed reactors and suspended bed reactors.

In the present application, the hydrocracking reaction may be carried out under conventional hydrocracking reaction conditions. For example, the conditions of the hydrocracking reaction may include: a reaction temperature of about 200-650° C., preferably about 300-510° C., a reaction pressure of about 3-24 MPa, preferably about 4-15 MPa, a liquid hourly space velocity of about 0.1-10 h$^{-1}$, preferably about 0.2-5 h$^{-1}$, and a hydrogen-to-oil ratio by volume of about 100-5000 Nm$^3$/m$^3$, preferably about 200-1000 Nm$^3$/m$^3$.

In the hydrocracking reaction, the hydrocracking catalyst according to the present application may be used alone, or in combination with a hydrocracking catalyst having a different composition.

In certain preferred embodiments, some fraction of the product from the hydrocracking reaction may be further recycled to the inlet of the reactor, so as to increase the yield of the desired product.

In a preferred embodiment, the hydrocracking process of the present application may further comprise a step of subjecting the hydrocracking catalyst to presulfiding with sulfur, hydrogen sulfide or a sulfur-containing feedstock at a temperature of about 140-370° C. in the presence of hydrogen to convert it to a sulfide form prior to its use in the hydrocracking reaction. This presulfiding can be carried out either outside the reactor or in situ inside the reactor.

In a preferred embodiment, the present application provides the following technical solutions:

A1. A phosphorus-containing molecular sieve, characterized in that, the molecular sieve has a phosphorus content of about 0.3-5% by weight, calculated as oxide, a pore volume of about 0.2 ml/g to about 0.95 ml/g, and a ratio of B acid content to L acid content of about 2 to about 10.

A2. The phosphorus-containing molecular sieve of Item A1, wherein the molecular sieve shows a 27Al-NMR structural spectrum having an $I_{60ppm}/I_{-1ppm}$ of about 5 to about 40 and an $I_{-1ppm}/I_{\pm 6ppm}$ of about 0.4 to about 2.

A3. A process for preparing a phosphorus-containing molecular sieve of Item A1 or A2, comprising:

a) subjecting a phosphorus-containing molecular sieve starting material to a hydrothermal treatment at a temperature of about 350-700° C. and a pressure of about 0.1-2 MPa for about 0.5-10 h in the presence of steam to obtain a hydrothermally treated molecular sieve material, wherein the phosphorus-containing molecular sieve starting material has a phosphorus content of about 0.1 wt % to about 15 wt %, and a sodium content of about 0.5 wt % to about 4.5 wt %, calculated as oxide and based on the dry weight of the phosphorus-containing molecular sieve starting material;

b) forming a slurry of the hydrothermally treated molecular sieve material obtained in the step a) with water to obtain a molecular sieve slurry, heating the molecular sieve slurry to about 40° C. to about 95° C., then maintaining at the temperature, and continuously adding an acid solution into the molecular sieve slurry, wherein the ratio of the weight of acid in the acid solution to the dry weight of the phosphorus-containing molecular sieve starting material is about 0.01:1 to about 0.6:1, calculated on the basis of H$^+$ relative to 1 L of the molecular sieve slurry, and wherein the acid solution is added at a rate of about 0.05 mol/h to about 10 mol/h, reacting at a constant temperature for about 0.5 h to about 20 h after the completion of the acid addition, and recovering a solid product.

A4. The method according to Item A3, wherein, in the step a), the phosphorus-containing molecular sieve starting material is a phosphorus-containing Y-type molecular sieve having a lattice constant of 2.425-2.470 nm, a specific surface area of about 250-750 m$^2$/g, and a pore volume of about 0.2-0.95 ml/g.

A5. The method according to Item A4, wherein, in step a), the phosphorus-containing molecular sieve starting material has a water content of about 10-40 wt %;

the phosphorus-containing molecular sieve starting material is in the form of particles, wherein the phosphorus-containing molecular sieve starting material having a particle size of about 1-500 mm accounts for about 10-100 wt % of the total weight of the phosphorus-containing molecular sieve starting material, with the particle size being the diameter of a circumscribed circle of the particle.

A6. The method according to Item A5, wherein the phosphorus-containing molecular sieve starting material having a particle size of about 1-500 mm accounts for about 30-100 wt % of the total weight of the phosphorus-containing molecular sieve starting material.

A7. The method according to Item A6, wherein the phosphorus-containing molecular sieve starting material having a particle size of about 5-100 mm accounts for about 30 wt % to about 100 wt % of the total weight of the phosphorus-containing molecular sieve starting material.

A8. The method according to Item A3, wherein, in step b), the ratio of the weight of water in the molecular sieve slurry obtained after slurrying to the dry weight of the phosphorus-containing molecular sieve starting material is about 14:1 to about 5:1.

A9. The method according to Item A3, wherein the method further comprises: in step b), adding an ammonium salt selected from the group consisting of ammonium nitrate, ammonium chloride, ammonium sulfate, and combinations thereof to the molecular sieve slurry during the addition of the acid solution, wherein the ratio of the weight of the ammonium salt to the dry weight of the phosphorus-containing molecular sieve starting material is in a range of about 0.1:1 to about 2.0:1.

A10. The method according to Item A3, wherein, in step b), the acid solution has an acid concentration of about 0.01 mol/L to about 15.0 mol/L, and the acid is selected from the group consisting of phosphoric acid, sulfuric acid, nitric acid, hydrochloric acid, acetic acid, citric acid, tartaric acid, formic acid, acetic acid, and combinations thereof.

A11. The method according to Item A3, wherein the method further comprises: recovering a solid product, then washing with water and drying to obtain a phosphorus-containing molecular sieve; wherein conditions for the drying include: a temperature of about 50-350° C., preferably about 70-200° C.; and a drying time of about 1-24 hours, preferably about 2-6 hours.

A12. Use of a phosphorus-containing molecular sieve according to Item A1 or A2 in the hydrocracking of hydrocarbon feedstocks.

A13. The use according to Item A12, wherein the hydrocarbon feedstock is selected from the group consisting of straight run gas oils, vacuum gas oils, demetallized oils, atmospheric residues, deasphalted vacuum residues, coker distillates, catalytic cracker distillates, shale oils, tar sand oils, coal liquefied oils, and combinations thereof; and conditions for the hydrocracking include: a reaction temperature of about 200-650° C., preferably about 300-510° C.; a reaction pressure of about 3-24 MPa, preferably about 4-15 MPa; a liquid hourly space velocity of about 0.1-10 $h^{-1}$, preferably about 0.2-5 $h^{-1}$; a hydrogen-to-oil ratio by volume of about 100-5000 $Nm^3/m^3$, preferably about 200-1000 $Nm^3/m^3$.

B1. A hydrocracking catalyst, characterized in that, the catalyst comprises about 45-90% by weight of a support, on a dry basis; about 1-40% by weight of a first metal component, calculated as metal oxide; and about 1-15% by weight of a second metal component, calculated as metal oxide, based on the dry weight of the catalyst;

wherein the support comprises a phosphorus-containing Y-type molecular sieve and a refractory inorganic oxide, and the weight ratio of the phosphorus-containing Y-type molecular sieve to the refractory inorganic oxide is about 0.03:1 to about 20:1; the first metal is a metal of Group VIB; and the second metal is a metal of Group VIII; and wherein the phosphorus-containing Y-type molecular sieve has a phosphorus content of about 0.3 wt % to about 5 wt %, calculated as oxide, a pore volume of about 0.2 ml/g to about 0.95 ml/g, and a ratio of B acid content to L acid content of about 2 to about 10 as measured by a pyridine infrared method.

B2. The catalyst according to Item B1, wherein the catalyst comprises about 55-85 wt % of the support, on a dry basis; about 12-35 wt % of the first metal component, calculated as metal oxide; and about 2-10 wt % of the second metal component, calculated as metal oxide, based on the dry weight of the catalyst; and the weight ratio of the phosphorus-containing Y-type molecular sieve to the refractory inorganic oxide is about 0.03:1 to about 6:1.

B3. The catalyst according to Item B1 or B2, wherein the phosphorus-containing Y-type molecular sieve shows a 27Al-NMR structural spectrum having an $I_{60ppm}/I_{-1ppm}$ of about 5-40 and an $I_{-1ppm}/I_{\pm 6ppm}$ of about 0.4-2.

B4. The catalyst according to Item B1 or B2, wherein the phosphorus-containing Y-type molecular sieve is prepared by a method comprising:

a) subjecting a phosphorus-containing molecular sieve starting material to a hydrothermal treatment at a temperature of about 350-700° C. and a pressure of about 0.1-2 MPa for about 0.5-10 h in the presence of steam to obtain a hydrothermally treated molecular sieve material; wherein the phosphorus-containing molecular sieve starting material has a phosphorus content of about 0.1 wt % to about 15 wt %, and a sodium content of about 0.5 wt % to about 4.5 wt %, calculated as oxide and based on the dry weight of the phosphorus-containing molecular sieve starting material;

b) forming a slurry of the hydrothermally treated molecular sieve material obtained in the step a) with water to obtain a molecular sieve slurry, heating the molecular sieve slurry to about 40° C. to about 95° C., maintaining at the temperature, and continuously adding an acid solution into the molecular sieve slurry, wherein the ratio of the weight of acid in the acid solution to the dry weight of the phosphorus-containing molecular sieve starting material is about 0.01:1 to about 0.6:1, calculated on the basis of $H^+$ relative to 1 L of the molecular sieve slurry, and the acid solution is added at a rate of about 0.05 mol/h to about 10 mol/h, reacting at a constant temperature for about 0.5 h to about 20 h after the completion of the acid addition, and recovering a solid product.

B5. The catalyst according to Item B4, wherein in the step a), the phosphorus-containing molecular sieve starting material is a phosphorus-containing Y-type molecular sieve having a lattice constant of 2.425-2.47 nm, a specific surface area of about 250-750 $m^2/g$, and a pore volume of about 0.2-0.95 ml/g.

B6. The catalyst according to Item B5, wherein, in step a), the phosphorus-containing molecular sieve starting material has a water content of about 10-40 wt %;

the phosphorus-containing molecular sieve starting material is in the form of particles, wherein the phosphorus-containing molecular sieve starting material having a particle size of 1-500 mm accounts for about 10-100 wt % of the total weight of the phosphorus-containing molecular sieve starting material, with the particle size being the diameter of a circumscribed circle of the particle.

B7. The catalyst according to Item B6, wherein the phosphorus-containing molecular sieve starting material having a particle size of 1-500 mm accounts for about 30-100% by weight of the total weight of the phosphorus-containing molecular sieve starting material;

preferably, the phosphorus-containing molecular sieve starting material having a particle size of 5-100 mm accounts for about 30 wt % to about 100 wt % of the total weight of the phosphorus-containing molecular sieve starting material.

B8. The catalyst according to Item B4, wherein, in step b), the ratio of the weight of water in the molecular sieve slurry obtained after slurrying to the dry weight of the phosphorus-containing molecular sieve starting material is about 14:1 to about 5:1.

B9. The catalyst according to Item B4, wherein the preparation of the phosphorus-containing Y-type molecular sieve further comprises: in step b), adding an ammonium salt selected from the group consisting of ammonium nitrate, ammonium chloride, ammonium sulfate, and combinations thereof to the molecular sieve slurry during the addition of the acid solution, and the ratio of the weight of the ammonium salt to the dry weight of the phosphorus-containing molecular sieve starting material is about 0.1:1 to about 2.0:1. B10. The catalyst according to Item B4, wherein, in step b), the acid solution has an acid concentration of about 0.01-15.0 mol/L, and the acid is selected from the group consisting of phosphoric acid, sulfuric acid, nitric acid, hydrochloric acid, acetic acid, citric acid, tartaric acid, formic acid, and acetic acid, and combinations thereof.

B11. The catalyst according to Item B4, wherein the preparation of the phosphorus-containing Y-type molecular sieve further comprises: recovering a solid product, then washing with water and drying to obtain a phosphorus-containing molecular sieve; and conditions for the drying include: a temperature of about 50-350° C., preferably about 70-200° C.; and a drying time of about 1-24 hours, preferably about 2-6 hours.

B12. The catalyst according to Item B1, wherein the refractory inorganic oxide is selected from the group consisting of alumina, zirconia, magnesia, thoria, beryllia, boric oxide, cadmium oxide, and combinations thereof; the first metal is molybdenum and/or tungsten; and the second metal is selected from the group consisting of iron, nickel, cobalt, and combinations thereof.

B13. A method for preparing a hydrocracking catalyst according to any of Items B1-B12, characterized in that, the method comprises: contacting a support with an impregnation solution containing a metal precursor for impregnation, and drying the material obtained after the impregnation.

B14. The method according to Item B13, wherein the method further comprises: mixing a phosphorus-containing Y-type molecular sieve, a refractory inorganic oxide, a peptizing agent and optionally a lubricant, and then shaping, drying and calcining to obtain the support.

B15. The method according to Item B13, wherein the metal precursor comprises a first metal precursor and a second metal precursor, wherein the first metal precursor is selected from the group consisting of inorganic acids of the first metal, inorganic salts of the first metal, metal-organic compounds of the first metal, and combinations thereof; wherein the inorganic salt is selected from the group consisting of nitrates, carbonates, hydroxycarbonates, hypophosphites, phosphates, sulfates, chlorides, and combinations thereof; and the organic moiety in the metal-organic compound of the first metal is selected from the group consisting of hydroxyl, carboxyl, amino, ketone group, ether group, alkyl, and combinations thereof;

the second metal precursor is selected from the group consisting of inorganic acids of the second metal, inorganic salts of the second metal, metal-organic compounds of the second metal, and combinations thereof; wherein the inorganic salt is selected from the group consisting of nitrates, carbonates, hydroxycarbonates, hypophosphites, phosphates, sulfates, chlorides, and combinations thereof; and the organic moiety in the metal-organic compound of the second metal is selected from the group consisting of hydroxyl, carboxyl, amino, ketone group, ether group, alkyl, and combinations thereof.

B16. The method according to Item B13, wherein the impregnation solution further contains an organic additive; and the concentration of the organic additive is about 2-300 g/L; wherein the organic additive is selected from the group consisting of ethylene glycol, glycerol, polyethylene glycol, diethylene glycol, butanediol, acetic acid, maleic acid, oxalic acid, nitrilotriacetic acid, 1,2-cyclohexanediaminetetraacetic acid, citric acid, tartaric acid, malic acid, ethylenediamine, di ethylenetriamine, cyclohexanediaminetetraacetic acid, glycine, nitrilotriacetic acid, ethylenediaminetetraacetic acid, ammonium ethyl enediaminetetraacetate, and combinations thereof.

B17. The method according to Item B13, wherein conditions for the drying include: a temperature of about 80-350° C., and a drying time of about 0.5-24 h.

B18. The method according to Item B13, wherein the method further comprises a step of drying the contacted material and then calcining, and conditions for the calcining include: a temperature of about 350-600° C., and a calcining time of about 0.2-12 h.

B19. Use of a hydrocracking catalyst according to any of Items B1-12 in the hydrocracking of hydrocarbon feedstocks.

B20. The use according to Item B19, wherein the hydrocarbon feedstock is selected from the group consisting of straight run gas oils, vacuum gas oils, demetallized oils, atmospheric residues, deasphalted vacuum residues, coker distillates, catalytic cracker distillates, shale oils, tar sand oils coal liquefied oils, and combinations thereof;

conditions for the hydrocracking include: a reaction temperature of about 200-650° C., preferably about 300-510° C.; a reaction pressure of about 3-24 MPa, preferably about 4-15 MPa; a liquid hourly space velocity of about 0.1-10 $h^{-1}$, preferably about 0.2-5 $h^{-1}$; and a hydrogen-to-oil ratio by volume of about 100-5000 $Nm^3/m^3$, preferably about 200-1000 $Nm^3/m^3$.

C1. A phosphorus-containing molecular sieve, having a phosphorus content of about 0.3-5 wt %, preferably about 0.4-2.0 wt %, calculated as oxide, and a pore volume of about 0.2-0.95 ml/g, preferably about 0.25-0.60 ml/g, and a ratio of B acid content to L acid content of about 2-10, preferably about 3.4-9.5.

C2. The phosphorous-containing molecular sieve according to Item C1, wherein the molecular sieve shows a 27Al-NMR structural spectrum having an $I_{60ppm}/I_{-1ppm}$ of about 5 to about 40, preferably about 10.0 to about 39, and an $I_{-1ppm}/I_{\pm 6ppm}$ of about 0.4 to about 2.

C3. The phosphorous-containing molecular sieve according to any of the preceding Items, wherein the molecular sieve has a lattice constant of 2.425-2.470 nm, preferably 2.430-2.458 nm, and a specific surface area of about 250-850 $m^2/g$, preferably about 400-750 $m^2/g$.

C4. The phosphorous-containing molecular sieve according to any of the preceding Items, wherein the molecular sieve has a faujasite structure, and is preferably a Y-type molecular sieve, more preferably a molecular sieve selected from the group consisting of NaY, HNaY, REY, USY molecular sieves, and combinations thereof.

C5. The phosphorus-containing molecular sieve according to any one of the preceding Items, wherein a cation site of the molecular sieve is occupied by one or more of sodium ion, ammonium ion and hydrogen ion.

C6. The phosphorous-containing molecular sieve according to any of the preceding Items, wherein the molecular sieve is prepared by a method comprising:
 i) subjecting a phosphorus-containing molecular sieve starting material to a hydrothermal treatment;
 ii) forming a slurry of the hydrothermally treated molecular sieve, wherein the ratio of the weight of water in the resulted molecular sieve slurry to the dry weight of the phosphorus-containing molecular sieve starting material is about 14:1 to about 5:1;
 iii) subjecting the resulted molecular sieve slurry to acid leaching; and
 iv) recovering a solid product,
 wherein the acid leaching of step iii) is carried out as follows: adding an acid solution to the molecular sieve slurry at a substantially constant rate at a temperature of about 40° C. to about 95° C., preferably about 50° C. to about 85° C., wherein the acid solution is added at a rate of about 0.05 mol/hr to about 10 mol/hr, preferably about 0.2 mol/hr to about 3.0 mol/hr, calculated on the basis of $H^+$ relative to 1 L of the molecular sieve slurry, and subjecting the resultant to an isothermal reaction, after the completion of the acid addition, for about 0.5 h to about 20 h, preferably about 0.5 h to about 15 h, wherein the ratio of the weight of the acid in the acid solution to the dry weight of the phosphorus-containing molecular sieve starting material is about 0.01:1 to about 0.6:1.

C7. A method for preparing a phosphorus-containing molecular sieve, comprising the following steps:
  i) subjecting a phosphorus-containing molecular sieve starting material to a hydrothermal treatment;
  ii) forming a slurry of the hydrothermally treated molecular sieve, wherein the ratio of the weight of water in the resulted molecular sieve slurry to the dry weight of the phosphorus-containing molecular sieve starting material is about 14:1 to about 5:1;
  iii) subjecting the resulted molecular sieve slurry to acid leaching; and
  iv) recovering a solid product,
wherein the acid leaching of step iii) is carried out as follows: adding an acid solution to the molecular sieve slurry at a substantially constant rate at a temperature of about 40° C. to about 95° C., preferably about 50° C. to about 85° C., wherein the acid solution is added at a rate of about 0.05 mol/hr to about 10 mol/hr, preferably about 0.2 mol/hr to about 3.0 mol/hr, calculated on the basis of $H^+$ relative to 1 L of the molecular sieve slurry, and subjecting the resultant to an isothermal reaction, after the completion of the acid addition, for about 0.5 h to about 20 h, preferably about 0.5 h to about 15 h, wherein the ratio of the weight of the acid in the acid solution to the dry weight of the phosphorus-containing molecular sieve starting material is about 0.01:1 to about 0.6:1.

C8. The method according to Item C7, wherein the phosphorus-containing molecular sieve starting material has a phosphorus content of about 0.1-15 wt %, preferably about 0.2-5.0 wt %, and a sodium content of about 0.5-4.5 wt %, preferably about 1.0-4.0 wt %, calculated as oxides and based on the dry weight of the phosphorus-containing molecular sieve starting material.

C9. The method according to any of Items C7 to C8, wherein the phosphorus-containing molecular sieve starting material is a phosphorus-containing Y-type molecular sieve having a lattice constant of 2.425-2.470 nm, preferably 2.440-2.470 nm, a specific surface area of about 250-750 $m^2/g$, preferably about 400-700 $m^2/g$, and a pore volume of about 0.2-0.95 ml/g, preferably about 0.2-0.5 ml/g.

C10. The method according to any of Items C7 to C9, wherein the phosphorus-containing molecular sieve starting material has a water content of about 10-40 wt %.

C11. The method according to any of Items C7 to C10, wherein the phosphorus-containing molecular sieve starting material is in the form of particles, and the phosphorus-containing molecular sieve starting material having a particle size of about 1-500 mm accounts for about 10-100 wt %, preferably about 30-100 wt %, of the total weight of the phosphorus-containing molecular sieve starting material, with the particle size being the diameter of a circumscribed circle of the particle; preferably, the phosphorus-containing molecular sieve starting material having a particle size of about 5-100 mm accounts for about 30 wt % to about 100 wt % of the total weight of the phosphorus-containing molecular sieve starting material.

C12. The method according to any of Items C7 to C11, wherein the hydrothermal treatment of step i) is carried out in the presence of steam, preferably in the presence of 30-100% of steam, under the following conditions: a temperature of about 350-700° C., a pressure of about 0.1-2 MPa, and a hydrothermal treatment time of about 0.5-10 h.

C13. The method according to any of Items C7 to C12, further comprising: in the acid leaching of step iii), adding an ammonium salt, preferably selected from the group consisting of ammonium nitrate, ammonium chloride, ammonium sulfate, and combinations thereof, to the molecular sieve slurry during the addition of the acid solution, and preferably the ratio of the weight of the ammonium salt to the dry weight of the phosphorus-containing molecular sieve starting material is about 0.1:1 to about 2.0:1.

C14. The method according to any of Items C7 to C13, wherein the acid solution used in the acid leaching of step iii) has an acid concentration of about 0.01-15.0 mol/L, preferably about 0.02-5.0 mol/L, and the acid is selected from the group consisting of phosphoric acid, sulfuric acid, nitric acid, hydrochloric acid, acetic acid, citric acid, tartaric acid, formic acid, acetic acid, and combinations thereof.

C15. The method according to any of Items C7 to C14, further comprising: after step iv), washing the resulted solid product with water and drying to obtain the phosphorus-containing molecular sieve; and conditions for the drying include: a temperature of about 50-350° C., preferably about 70-200° C.; and a drying time of about 1-24 hours, preferably about 2-6 hours.

C16. The method according to any of Items C7 to C15, wherein the addition of the acid solution in the acid leaching of step iii) is carried out in multiple times, preferably in 2-10 times, wherein the acid solution is added at a substantially constant rate of about 0.05 mol/h to about 10 mol/h, preferably about 0.2 mol/h to about 3.0 mol/h, calculated on the basis of $H^+$ relative to 1 L of the molecular sieve slurry during each time of addition, and after each addition, the resultant is subjected to an isothermal reaction for a period of time such that the total isothermal reaction time is about 0.5-20 hours, preferably about 0.5-15 hours; preferably, where the acid solution is added in multiple times, the ratio of the weight of acid in the acid solution to the dry weight of the phosphorus-containing molecular sieve starting material is about 0.01:1 to about 0.3:1.

C17. The method according to any of Items C7 to C16, comprising the steps of:
  i) subjecting the phosphorus-containing molecular sieve starting material to a hydrothermal treatment in the presence of steam, preferably in the presence of 30-100% of steam, at a temperature of about 350-700° C. and a pressure of about 0.1-2 MPa for about 0.5-10 h to obtain a hydrothermally treated molecular sieve;
  ii) forming a slurry of the hydrothermally treated molecular sieve with water to obtain a molecular sieve slurry, wherein the ratio of the weight of water in the molecular sieve slurry to the dry weight of the phosphorus-containing molecular sieve starting material is about 14:1 to about 5:1;
  iii) heating the molecular sieve slurry to a temperature of about 40-95° C., preferably about 50-85° C., maintaining at the temperature and adding an acid solution to the molecular sieve slurry at a substantially constant rate, wherein the ratio of the weight of the acid in the acid solution to the dry weight of the phosphorus-containing molecular sieve starting material is in a range of about 0.01:1 to about 0.6:1, calculated on the basis of $H^+$ relative to 1 L of the molecular sieve slurry, wherein the acid solution is added at a rate of about 0.05 mol/h to about 10 mol/h, preferably about 0.2-3.0 mol/h, and subjecting the resultant to an isothermal reaction for about 0.5 h to about 20 h, preferably about 0.5-15 h, after the completion of the acid addition; and iv) recovering a solid product.

C18. A phosphorus-containing molecular sieve obtained by the method according to any of Items C7 to C17.

C19. A hydrocracking catalyst, comprising, on a dry basis and based on the weight of the catalyst, from about 45 wt % to about 90 wt %, preferably from about 55 wt % to about 85 wt %, of a support, from about 1 wt % to about 40 wt %, preferably from about 12 wt % to about 35 wt %, of the first metal component, calculated as metal oxide, and from about 1 wt % to about 15 wt %, preferably from about 2 wt % to about 10 wt %, of the second metal component, calculated as metal oxide, wherein:

the support comprises a phosphorus-containing molecular sieve according to any of Items C1 to C6 and C18 and a refractory inorganic oxide, wherein the weight ratio of the phosphorus-containing molecular sieve to the refractory inorganic oxide is about 0.03:1 to about 20:1, preferably about 0.03:1 to about 6:1; the first metal is a metal of Group VIB; and the second metal is a metal of Group VIII.

C20. The catalyst according to Item C19, wherein the refractory inorganic oxide is selected from the group consisting of alumina, silica, amorphous silica-alumina compounds, zirconia, magnesia, thoria, beryllia, boric oxide, cadmium oxide, and combinations thereof; the first metal is molybdenum and/or tungsten; and the second metal is selected from the group consisting of iron, nickel, cobalt, and combinations thereof.

C21. A method for preparing a hydrocracking catalyst according to any of Items C19 to C20, comprising the steps of contacting a support with an impregnation solution containing a metal precursor for impregnation and drying the material obtained after the impregnation, wherein:

the support comprises a phosphorus-containing molecular sieve according to any of Items C1 to C6 and C18 and a refractory inorganic oxide, and preferably, the weight ratio of the phosphorus-containing molecular sieve to the refractory inorganic oxide is about 0.03:1 to about 20:1, preferably about 0.03:1 to about 6:1; and the metal precursor comprises a first metal precursor and a second metal precursor, wherein the first metal is a metal of Group VIB, and the second metal is a metal of Group VIII.

C22. The method according to Item C21, further comprising the steps of: mixing the phosphorus-containing molecular sieve and the refractory inorganic oxide with a peptizing agent and optionally a lubricant, and then shaping, drying and calcining to obtain the support.

C23. The method according to Items C21 or C22, wherein the first metal precursor is selected from the group consisting of inorganic acids of the first metal, inorganic salts of the first metal, metal-organic compounds of the first metal, and combinations thereof; wherein the inorganic salt is preferably selected from the group consisting of nitrates, carbonates, hydroxycarbonates, hypophosphites, phosphates, sulfates, chlorides, and combinations thereof; and the organic moiety in the metal-organic compound of the first metal is selected from the group consisting of hydroxyl, carboxyl, amino, ketone group, ether group, alkyl, and combinations thereof; and the second metal precursor is selected from the group consisting of inorganic acids of the second metal, inorganic salts of the second metal, metal-organic compounds of the second metal, and combinations thereof; wherein the inorganic salt is selected from the group consisting of nitrates, carbonates, hydroxycarbonates, hypophosphites, phosphates, sulfates, chlorides, and combinations thereof; and the organic moiety in the metal-organic compound of the second metal is selected from the group consisting of hydroxyl, carboxyl, amino, ketone group, ether group, alkyl, and combinations thereof.

C24. The method according to any of Items C21 to C23, wherein the impregnation solution further contains an organic additive in a concentration of about 2-300 g/L, and the organic additive is preferably selected from the group consisting of ethylene glycol, glycerol, polyethylene glycol, diethylene glycol, butanediol, acetic acid, maleic acid, oxalic acid, nitrilotriacetic acid, 1,2-cyclohexanediaminetetraacetic acid, citric acid, tartaric acid, malic acid, ethylenediamine, di ethylenetriamine, cyclohexanediaminetetraacetic acid, glycine, nitrilotriacetic acid, ethylenediaminetetraacetic acid, ammonium ethyl enediaminetetraacetate, and combinations thereof.

C25. The method according to any of Items C21 to C24, wherein the material obtained after the impregnation is dried under the following conditions: a temperature of about 80-350° C., preferably 100-300° C. and a drying time of about 0.5-24 h, preferably about 1-12 h.

C26. The method according to any of Items C21 to C25, further comprising a step of calcining the dried material under the following conditions: a temperature of about 350-600° C., and a calcining time of about 0.2-12 h.

C27. Use of a phosphorus-containing molecular sieve according to any of Items C1 to C6 and C18 in the preparation of a hydrocracking catalyst useful for the hydrocracking of hydrocarbon feedstocks.

C28. Use of a phosphorus-containing molecular sieve according to any of Items C1 to C6 and C18, or a hydrocracking catalyst according to any of Items C19 to C20 in the hydrocracking of hydrocarbon feedstocks.

C29. The use according to Item C27 or 28, wherein the hydrocarbon feedstock is selected from the group consisting of straight run gas oils, vacuum gas oils, demetallized oils, atmospheric residues, deasphalted vacuum residues, coker distillates, catalytic cracker distillates, shale oils, tar sand oils, coal liquefied oils, and combinations thereof.

C30. The use according to Item C27 or C28, wherein conditions for the hydrocracking include: a reaction temperature of about 200-650° C., preferably about 300-510° C.; a reaction pressure of about 3-24 MPa, preferably about 4-15 MPa; a liquid hourly space velocity of about 0.1-10 $h^{-1}$, preferably about 0.2-5 $h^{-1}$; and a hydrogen-to-oil ratio by volume of about 100-5000 $Nm^3/m^3$, preferably about 200-1000 $Nm^3/m^3$.

C31. A process for hydrocracking a hydrocarbon feedstock, comprising the step of hydrocracking the hydrocarbon feedstock in the presence of a phosphorus-containing molecular sieve according to any of Items C1 to C6 and C18 or a hydrocracking catalyst according to any of Items C19 and C20.

C32. The method according to Item C31, wherein the hydrocarbon feedstock is selected from the group consisting of straight run gas oils, vacuum gas oils, demetallized oils, atmospheric residues, deasphalted vacuum residues, coker distillates, catalytic cracker distillates, shale oils, tar sand oils, coal liquefied oils, and combinations thereof.

C33. The method according to Item C31 or C32, wherein conditions for the hydrocracking include: a reaction temperature of about 200-650° C., preferably about 300-510° C.; a reaction pressure of about 3-24 MPa, preferably about 4-15 MPa; a liquid hourly space velocity of about 0.1-10 h⁻¹, preferably about 0.2-5 h⁻¹; and a hydrogen-to-oil ratio by volume of about 100-5000 Nm³/m³, preferably about 200-1000 Nm³/m³.

EXAMPLES

The present application will be further illustrated by examples hereinbelow, which are not intended to be limiting in any manner.

Instrument and Device

In the following examples and comparative examples, the pore volume and specific surface area of the molecular sieve were measured in accordance with a static low-temperature adsorption capacity method (using the method of Chinese National Standard GB/T5816-1995) using an ASAP 2400 Automatic Adsorption Apparatus from Micromeritics Instrument Corporation, USA. In particular, the measurement was carried out by: evacuating and degassing at 250° C. and 1.33 Pa for 4 hr, contacting with nitrogen as adsorbate at −196° C. till arriving at static adsorption equlibrium; calculating the nitrogen adsorption amount of the adsorbent based on the difference between the nitrogen gas inflow and the nitrogen gas remaining in the gas phase after adsorption, calculating the pore size distribution using a BJH equation, and calculating the specific surface area and the pore volume using a BET equation.

In the following examples and comparative examples, the lattice constant of the molecular sieve was measured using a D5005 X-ray Diffractometer from Siemens, Germany, in accordance with the method of Chinese Petrochemical Industry Standard SH/T0339-92. Conditions for the measurement include: Cu target, Ka radiation, solid detector, a tube voltage of 40 kV, a tube current of 40 mA, and step scanning with a step width of 0.02°, a prefabrication time of 2 s, and a scanning range of 5°-70°.

In the following examples and comparative examples, the phosphorus content and sodium content of the molecular sieve were measured using 3271E X-ray Fluorescence Spectrometer from Rigaku Industrial Corporation, Japan. In particular, the measurement was carried out by: making a tablet of a powder sample by compression, detecting the spectral line intensity of each element by a scintillation counter and a proportional counter using a rhodium target, a laser voltage of 50 kV and a laser current of 50 mA, and carrying out quantitative and semi-quantitative analysis on the content of the element using an external standard method.

In the following examples and comparative examples, the ratio of B acid content to L acid content of the molecular sieve was measured using Bio-Rad IFS-3000 Infrared Spectrometer. In particular, the measurement was carried out by: grinding a molecular sieve sample, pressing into a self-supporting sheet of about 10 mg/cm², placing the self-supporting sheet in an in-situ pool of the infrared spectrometer, performing a surface cleaning at 350° C. and a vacuum of 10⁻³ Pa for 2 hours, introducing a saturated vapor of pyridine after cooling to room temperature, performing an adsorption for 15 minutes till equilibrium, performing vacuum desorption for 30 minutes at 350° C., and measuring the vibration spectrum of adsorbed pyridine after cooling to room temperature. The scanning range was 1400 cm⁻¹ to 1700 cm⁻¹. The B acid content was defined as the ratio of the infrared absorption value of the 1540±5 cm⁻¹ band to the weight and area of the sample sheet [the infrared absorption value per unit area and unit mass of the sample, expressed as: $AB \cdot (cm^2 \cdot g)^{-1}$]. The L acid content was defined as the ratio of the infrared absorption value of the 1450±5 cm⁻¹ band to the weight and area of the sample sheet [the infrared absorption value per unit area and unit mass of the sample, expressed as: $AL \cdot (cm^2 \cdot g)^{-1}$]. The ratio of AB/AL was defined as the ratio of B acid content to L acid content of the zeolite molecular sieve.

In the following examples and comparative examples, the 27Al-NMR structural spectrum of the molecular sieve was analyzed using UNITYLINOVA 300M Nuclear Magnetic Resonance Apparatus from Varian, in which the Al MAS NMR resonance frequency was 78.162 MHz, the rotor speed was 3000 Hz, the repetition delay time was 0.5 s, the sampling time was 0.020 s, the pulse width was 1.6 μs, the spectral width was 54.7 kHz, the data was collected at 2000 points, the cumulative number was 800, and the test temperature was room temperature.

Parameters

Parameters reported in the following examples and comparative examples are calculated as follows:

Yield of molecular sieve (%)=dry weight of the molecular sieve obtained/dry weight of the molecular sieve starting material before the hydrothermal treatment×100%.

Conversion of feedstock (%)=(amount of the fraction having an initial boiling point of more than 350° C. in the feedstock oil−amount of the fraction having an initial boiling point of more than 350° C. in the product oil)/amount of the fraction having an initial boiling point of more than 350° C. in the feedstock oil×100%.

Preparation of Molecular Sieves

Examples I-1 to I-3 below are examples of the preparation of phosphorus-containing molecular sieves according to the present application, and Comparative Examples I-1 to I-4 are examples of the preparation of molecular sieves not in accordance with the present application.

Example I-1

To 300 g of NaY molecular sieve (available from Changling Branch of Sinopec Catalyst Co., Ltd. under the name of NaY, having a lattice constant of 2.468 nm, a specific surface area of 680 m²/g, a pore volume of 0.30 ml/g, a Na₂O content of 13.0 wt % and an Al₂O₃ content of 22 wt %), 2.0 mol/L of $(NH_4)_2HPO_4$ aqueous solution was added, slurried, with the total amount of water being 1000 ml, and then filtered. The resulted filter cake was subjected to the above-mentioned process three times, and then dried at 100° C. for 1 h to obtain a phosphorus-containing molecular sieve starting material, which had a lattice constant of 2.468 nm, a specific surface area of 590 m²/g, a pore volume of 0.37 ml/g, a P₂O₅ content of 4.8 wt % and a Na₂O content of 3.5 wt %.

100 g of the phosphorus-containing molecular sieve starting material was put into a hydrothermal treatment device, 100% of steam was introduced, the temperature was raised to 450° C., the pressure in the device was controlled to 0.8 MPa, a hydrothermal treatment was carried out under constant conditions for 8 hours, and then the hydrothermally treated molecular sieve material was taken out.

100 ml of a hydrochloric acid-ammonium chloride aqueous solution was prepared using hydrochloric acid, ammonium chloride and the phosphorus-containing molecular sieve starting material (dry basis) at a weight ratio of 0.2:0.4:1, so that the concentration of hydrochloric acid in the aqueous solution was 0.05 mol/L, and the concentration of ammonium chloride in the aqueous solution was 0.07 mol/L.

To 50 g (dry basis) of the hydrothermally treated molecular sieve material, 500 ml of deionized water was added, stirred and slurried, to obtain a molecular sieve slurry, and then heated to 80° C. The prepared hydrochloric acid-ammonium chloride aqueous solution was added into the molecular sieve slurry at a constant rate of 2 mol/h, calculated on the basis of $H^+$ relative to 1 L of the molecular sieve slurry, in three times, the resultant was reacted for 4 hours at a constant temperature after each time of acid addition, then filtered, and a next acid addition was performed in the same manner on the filter cake. After the last time of acid addition and 4 hours of subsequent reaction, a solid product was recovered, and dried at 180° C. for 3 h to obtain a phosphorus-containing molecular sieve Y-1, having a lattice constant of 2.436 nm, a specific surface area of 634 $m^2$/g, a $Na_2O$ content of 0.42 wt %, and an $Al_2O_3$ content of 18.7 wt %. The 27Al-NMR structural spectrum of the molecular sieve is shown in FIG. 1, and other properties are shown in Table 1.

Example I-2

To 300 g of PSRY molecular sieve (available from Changling Branch of Sinopec Catalyst Co., Ltd. under the name of PSRY, having a lattice constant of 2.456 nm, a specific surface area of 620 $m^2$/g, a pore volume of 0.39 ml/g, a $Na_2O$ content of 2.2 wt %, a $P_2O_5$ content of 1.5 wt % and an $Al_2O_3$ content of 18 wt %), deionized water was added and slurried, with the total amount of water being 1000 ml, filtered, and dried at 70° C. for 2 h to obtain a phosphorus-containing molecular sieve starting material with a water content of 35 wt %.

The phosphorus-containing molecular sieve starting material was crushed, sieved to 5-20 meshes (wherein particles having a particle size of about 1-500 mm account for 70 wt % of the total weight of the phosphorus-containing molecular sieve starting material), put into a hydrothermal treatment device, 100% of steam was introduced, the temperature was raised to 580° C., the pressure in the device was controlled to 0.4 MPa, a hydrothermal treatment was performed for 2 hours under constant conditions, and the hydrothermally treated molecular sieve material was taken out.

250 ml of a sulfuric acid aqueous solution was prepared using sulfuric acid and the phosphorus-containing molecular sieve starting material (dry basis) at a weight ratio of 0.02:1, so that the concentration of sulfuric acid in the aqueous solution was 0.2 mol/L.

To 50 g (dry basis) of the hydrothermally treated molecular sieve material, 500 ml of deionized water was added, stirred and slurried, to obtain a molecular sieve slurry, and then heated to 80° C. The prepared sulfuric acid aqueous solution was added into the molecular sieve slurry at a constant rate of 0.5 mol/h, calculated on the basis of $H^+$ relative to 1 L of molecular sieve slurry, in three times, the resultant was reacted for 2 hours at a constant temperature after each time of acid addition, then filtered, and a next acid addition was performed in the same manner on the filter cake. After the last time of acid addition and 2 hours of subsequent reaction, a solid product was recovered, and dried at 100° C. for 8 hours to obtain a phosphorus-containing molecular sieve Y-2, having a lattice constant 2.447 nm, a specific surface area of 684 $m^2$/g, a $Na_2O$ content of 0.08 wt %, and an $Al_2O_3$ content of 14.4 wt %.

The 27Al-NMR structural spectrum of the molecular sieve is shown in FIG. 1, and other properties are shown in Table 1.

Example I-3

A phosphorus-containing molecular sieve was prepared as described in Example I-2, except that the phosphorus-containing molecular sieve staring material was crushed and sieved to 5-20 meshes (wherein particles have a particle size of about 5-100 mm account for 70 wt % of the total weight of the phosphorus-containing molecular sieve staring material), and then the hydrothermal treatment and subsequent operations were performed as described in Example 1-2, to obtain a phosphorus-containing molecular sieve Y-3, having a lattice constant of 2.438 nm, a specific surface area of 733 $m^2$/g, a $Na_2O$ content of 0.08 wt %, and an $Al_2O_3$ content of 8.1 wt %. The 27Al-NMR structural spectrum of the molecular sieve is shown in FIG. 1, and other properties are shown in Table 1.

Comparative Example I-1

The phosphorus-containing molecular sieve of this comparative example was a PSRY molecular sieve as described in Example I-2, and it was prepared according to the method for preparing phosphorus-containing zeolites disclosed in Chinese patent publication No. CN1088407C. In particular, a phosphorus-containing compound was directly mixed with a zeolite starting material at a weight ratio of 0.2, and heated at 520° C. for at least 0.1 h under a sealed condition, the resulted product was washed with deionized water until no acid radical ions were detected, and a phosphorus-containing zeolite designated as RY-1 was recovered. The zeolite had a lattice constant of 2.456 nm, a specific surface area of 620 $m^2$/g, a $Na_2O$ content of 2.53 wt %, and an $Al_2O_3$ content of 20.7 wt %. The 27Al-NMR structural spectrum of the molecular sieve is shown in FIG. 1, and other properties are shown in Table 1.

Comparative Example I-2

100 g of phosphorus-free HY molecular sieve (available from Changling Branch of Sinopec Catalyst Co., Ltd. under the name of HY, having a lattice constant of 2.465 nm, a specific surface area of 580 $m^2$/g, a pore volume of 0.33 ml/g, a $Na_2O$ content of 0.3 wt % and an $Al_2O_3$ content of 22 wt %) was put into a hydrothermal treatment device, 100% of steam was introduced, the temperature was raised to 450° C., the pressure in the device was controlled to 0.8 MPa, a hydrothermal treatment was performed under constant conditions for 8 hours, and the hydrothermally treated molecular sieve material was taken out.

50 ml of a hydrochloric acid-ammonium chloride aqueous solution was prepared using hydrochloric acid, ammonium chloride and the molecular sieve starting material at a weight ratio of 0.08:1.5:1, so that the concentration of hydrochloric acid in the aqueous solution was 0.1 mol/L, and the concentration of ammonium chloride in the aqueous solution was 0.14 mol/L.

To 50 g (dry basis) of the hydrothermally treated molecular sieve material, 500 ml of deionized water was added, stirred and slurried, to obtain a molecular sieve slurry, and then heated to 80° C. The prepared hydrochloric acid-ammonium chloride aqueous solution was added into the molecular sieve slurry at a constant rate of 2 mol/h, calculated on the basis of $H^+$ relative to 1 L of the molecular sieve slurry, in three times, the resultant was reacted for 4 hours at a constant temperature after each time of acid addition, then filtered, and a next acid addition was performed in the same manner on the filter cake. After the last addition of acid and 4 hours of subsequent reaction, a solid product was recovered and dried at 180° C. for 3 hours to obtain a molecular sieve RY-2, having a lattice constant of 2.434 nm, a specific surface area of 694 m²/g, a Na₂O content of 0.08 wt %, an Al₂O₃ content of 10.2 wt %. The 27Al-NMR structural spectrum of the molecular sieve is shown in FIG. 1, and other properties are shown in Table 1.

Comparative Example I-3

To 300 g of PSRY molecular sieve (the same as in Example I-2), 600 ml of NH₄Cl aqueous solution having a concentration of 0.5 mol/L was added, and deionized water was used for slurrying, with the total amount of water being 1000 ml. The resultant was heated to 90° C., subjected to ammonium exchange for 3 h, then filtered, washed twice with deionized water and the filter cake was heated at 600° C. for 4 h at atmospheric pressure.

300 ml of a hydrochloric acid-ammonium chloride aqueous solution was prepared using hydrochloric acid, ammonium chloride and the phosphorus-containing molecular sieve starting material at a weight ratio of 0.5:0.36:1, so that the concentration of hydrochloric acid in the aqueous solution was 0.6 mol/L, and the concentration of ammonium chloride in the aqueous solution was 0.3 mol/L.

To 50 g (dry basis) of the treated molecular sieve material, 500 ml of deionized water was added, stirred and slurried, to obtain a molecular sieve slurry, and then heated to 80° C. The prepared hydrochloric acid-ammonium chloride aqueous solution was added into the molecular sieve slurry at a constant rate of 2 mol/h, calculated on the basis of H⁺ relative to 1 L of the molecular sieve slurry, in three times, the resultant was reacted for 4 hours at a constant temperature after each time of acid addition, then filtered, and a next acid addition was performed in the same manner on the filter cake. After the last time of acid addition and 4 hours of subsequent reaction, a solid product was recovered, and dried at 180° C. for 3 hours to obtain a phosphorus-containing molecular sieve RY-3, having a lattice constant 2.427 nm, a specific surface area of 608 m²/g, a Na₂O content of 0.12 wt %, an Al₂O₃ content of 7.8 wt %. The 27Al-NMR structural spectrum of the molecular sieve is shown in FIG. 1, and other properties are shown in Table 1.

Comparative Example I-4

To 300 g of PSRY molecular sieve (the same as Example I-2), deionized water was added and slurried, with the total amount of water being 1000 ml, filtered, and dried at 70° C. for 2 h to obtain a phosphorus-containing molecular sieve starting material with a water content of 65%.

The resulted phosphorus-containing molecular sieve starting material was put into a hydrothermal treatment device, the temperature was raised to 580° C., the pressure in the device was controlled to 0.4 MPa, a hydrothermal treatment was performed for 2 hours under constant conditions, and the hydrothermally treated molecular sieve material was taken out.

500 ml of a sulfuric acid aqueous solution was prepared using sulfuric acid and the phosphorus-containing molecular sieve starting material at a weight ratio of 0.8:1, so that the concentration of sulfuric acid in the aqueous solution was 0.2 mol/L.

To 50 g (dry basis) of the hydrothermally treated molecular sieve material, 500 ml of deionized water was added, stirred and slurried, to obtain a molecular sieve slurry, and then heated to 80° C. The prepared sulfuric acid aqueous solution was added into the molecular sieve slurry in three times. In each time of addition, the solution was directly poured into the slurry, the resultant was reacted for 2 hours at a constant temperature, then filtered, and a next acid addition was performed in the same manner on the filter cake. After the last time of acid addition and 2 hours of subsequent reaction, a solid product was recovered, and dried at 100° C. for 8 hours to obtain a phosphorus-containing molecular sieve RY-4, having a lattice constant 2.432 nm, a specific surface area of 485 m²/g, a Na₂O content of 0.12 wt %, and an Al₂O₃ content of 4.6 wt %. The 27Al-NMR structural spectrum of the molecular sieve is shown in FIG. 1, and other properties are shown in Table 1.

TABLE 1

Properties of the molecular sieves obtained in the Examples and Comparative Examples

| Molecular sieve No. | Phosphorus content (wt %) | Pore volume (ml/g) | Specific surface area (m²/g) | Lattice constant (nm) | B acid content/ L acid content | $I_{60ppm}/I_{-1ppm}$ | $I_{-1ppm}/I_{+6ppm}$ | Molecular sieve yield (%) |
|---|---|---|---|---|---|---|---|---|
| Y-1 | 1.0 | 0.43 | 634 | 2.436 | 8.7 | 37.20 | 1.95 | 50 |
| Y-2 | 0.6 | 0.38 | 684 | 2.443 | 4.2 | 5.2 | 1.2 | 60 |
| Y-3 | 1.3 | 0.39 | 733 | 2.438 | 3.5 | 11.1 | 0.46 | 70 |
| RY-1 | 2.3 | 0.37 | 620 | 2.456 | 3.2 | 5.5 | 2.7 | 50 |
| RY-2 | 0.01 | 0.32 | 694 | 2.434 | 2.1 | 18.8 | 191.00 | 50 |
| RY-3 | 1.5 | 0.35 | 608 | 2.427 | 1.5 | 8.8 | 84.8 | 50 |
| RY-4 | 0.7 | 0.43 | 485 | 2.432 | 1.3 | 3.2 | 271.3 | 50 |

As can be seen from Table 1, the phosphorus-containing molecular sieve according to the present application has a specific combination of characteristics, particularly, a higher ratio of B acid content to L acid content and a lower ratio of $I_{-1ppm}/I_{\pm 6ppm}$, and the method for preparing a phosphorus-containing molecular sieve according to the present application can improve the yield of molecular sieve by controlling the particle size of the phosphorus-containing molecular sieve starting material.

Preparation of Catalysts

The following Examples II-1 to II-5 are examples of the preparation of hydrocracking catalysts according to the present application, and Comparative Examples II-1 to II-4 are examples of the preparation of hydrocracking catalysts not in accordance with the present application.

Example II-1

583.3 g of pseudo-boehmite powder PB90 (available from Changling Branch of Sinopec Catalyst Co., Ltd., having a pore volume of 0.9 ml/g and a water content of 28 wt %), 98.8 g Y-1 molecular sieve (with a water content of 19 wt %) and 18 g of sesbania powder were mixed uniformly, 580 ml of an aqueous solution containing 18 ml of nitric acid (65-68 wt %, available from Beijing Chemical Reagents) was added, and extruded into a trilobal strip with a circumscribed circle diameter of 1.6 mm. The trilobal strip was dried at 120° C. and calcined at 600° C. for 3 h to obtain a support CS-1.

After cooling to room temperature, 100 g of the CS-1 support was impregnated with 80 ml of an aqueous solution containing 52 g of ammonium metatungstate (tungsten oxide content of 82 wt %, available from Sichuan Zigong Cemented Carbide Plant), 8.7 g of basic nickel carbonate (nickel oxide content of 51 wt %, available from Jiangsu Yixing Xuchi Chemical Co., Ltd.) and 10.5 g of citric acid as an impregnation solution, and dried at 120° C. for 10 hours to obtain a hydrocracking catalyst, the composition of which is shown in Table 2.

Examples II-2 to II-3

Catalysts were prepared as described in Example II-1, except that the molecular sieves used were Y-2 and Y-3, respectively. The compositions of the resulted catalysts are shown in Table 2.

Example II-4

178 g of pseudo boehmite powder SB (available from Sasol Company under the name of SB powder, dry basis content of 0.72) and 31.6 g of HY molecular sieve (available from Changling Branch of Sinopec Catalyst Co., Ltd. under the name of HY, dry basis content of 0.76) were mixed uniformly, 10 g of molecular sieve Y-2 (water content of 19 wt %) and 2.2 g of sesbania powder were added, and mixed uniformly. 200 ml of an aqueous solution containing 2 ml of nitric acid (65-68 wt %, available from Beijing Chemical Reagents) was added, extruded into a trilobal strip with a circumscribed circle diameter of 1.6 mm, dried at 120° C., and calcined at 550° C. for 3 hours to obtain a support CS-4.

After cooling to room temperature, 100 g of the CS-4 support was impregnated with 90 ml of an aqueous solution containing 24.1 g of ammonium heptamolybdate (available from Tianjin Sifang Chemical Development Co., Ltd., molybdenum oxide content of 82 wt %), dried at 120° C. for 10 hours, and then impregnated with 50 ml of an aqueous solution containing 46.2 g of nickel nitrate (Jiangsu Yixing Xuchi Chemical Co., Ltd., nickel oxide content of 25.6 wt %), dried at 90° C. for 5 hours, and calcined at 420° C. for 3 hours, to obtain a hydrocracking catalyst, the composition of which is shown in Table 2.

Example II-5

67.6 g of pseudo-boehmite powder PB100 (available from Changling Branch of Sinopec Catalyst Co., Ltd., having a pore volume of 1.05 ml/g, and a water content of 29 wt %), 138 g of molecular sieve Y-3 (water content of 19 wt %), and 6.2 g of sesbania powder were mixed uniformly, 144 ml of an aqueous solution containing 20 g of urea (Beijing Chemical Reagents) was added, extruded into a trilobe strip with a circumscribed circle diameter of 1.6 mm, dried at 120° C., and calcined at 600° C. for 3 h to obtain a support CS-5.

After cooling to room temperature, 100 g of the support was impregnated with 85 ml of an aqueous solution containing 39.2 g of ammonium metatungstate (available from Sichuan Zigong Cemented Carbide Plant, tungsten oxide content of 91 wt %), 20.56 g of nickel nitrate (available from Jiangsu Yixing Xuchi Chemical Co., Ltd., nickel oxide content of 25.6%) and 0.26 g of ethylene glycol, and dried at 180° C. for 3 hours to obtain a hydrocracking catalyst, the composition of which is shown in Table 2.

Comparative Examples II-1 to II-4

Catalysts were prepared as described in Example II-1, except that the molecular sieves used were RY-1, RY-2, RY-3 and RY-4, respectively. The compositions of the resulted catalysts are shown in Table 2.

TABLE 2

Compositions of the catalysts obtained in the Examples and Comparative Examples

| Item | Composition of the support | | Composition of the catalyst | | |
|---|---|---|---|---|---|
| | Refractory oxide, wt % | Phosphorus-containing molecular sieve, wt % | Group VIB metal, wt % | Group VIII metal, wt % | Support, wt % |
| Ex. II-1 | 84 | 16 | 29 | 3 | 68 |
| Ex. II-2 | 84 | 16 | 29 | 3 | 68 |
| Ex. II-3 | 84 | 16 | 29 | 3 | 68 |
| Ex. II-4 | 95 | 5 | 15 | 9 | 76 |
| Ex. II-5 | 30 | 70 | 25 | 5 | 70 |
| Comp. Ex. II-1 | 84 | 16 | 29 | 3 | 68 |
| Comp. Ex. II-2 | 84 | 16 | 29 | 3 | 68 |
| Comp. Ex. II-3 | 84 | 16 | 29 | 3 | 68 |
| Comp. Ex. II-4 | 84 | 16 | 29 | 3 | 68 |

Application Example

This application example was used to evaluate the catalytic activity for hydrocracking of the catalysts obtained in Examples II-1 to II-5 and those obtained in Comparative Examples II-1 to II-4. The feedstock oil used was the secondary vacuum side gas oil derived from Saudi Arabian light crude oil, of which the physicochemical properties are shown in Table 3.

TABLE 3

Physicochemical properties of the feedstock oil

| Item | Feedstock oil |
|---|---|
| Density (20° C.) (g/cm$^3$) | 0.8885 |
| S (wt %) | 16000 |
| N (mg/L) | 352 |
| Simulated distillation (ASTM D-2887) (° C.) | |
| Initial boiling point | 291 |
| 50 wt % | 391 |
| 90 wt % | 421 |

In this application example, the catalysts were evaluated as follows: the catalyst was crushed into particles having a diameter of 2-3 mm, 20 ml of the catalyst was charged into a 30 ml fixed bed reactor, and before the reaction, the catalyst was first sulfurized with a kerosene containing 2 wt % of carbon disulfide under a hydrogen atmosphere according to the procedure described below, and then the oil was switched to the feedstock oil for the reaction.

The sulfuration procedure was as follows: the reactor was heated to 150° C., a vulcanized oil was introduced, and the reaction mixture was kept at the temperature for 1 h; heated to 230° C. at a rate of 60° C./h, stabilized for 2 h, then heated to 360° C. at a rate of 60° C./h, and stabilized for 6 h. Then, the oil was switched to the feedstock oil, the conditions were adjusted as follows, and the reaction system was stabilized for at least 20 hours.

The hydrocracking reaction was carried out under the following conditions: a reaction temperature of 365° C., a hydrogen partial pressure of 6.4 MPa, a liquid hourly space velocity (LHSV) of 1 h$^{-1}$, and a hydrogen-to-oil ratio (by volume) of 800 Nm$^3$/m$^3$. The results are shown in Table 4.

TABLE 4

Results of the Application Example

| Catalysts | Conversion of the feedstock (%) |
|---|---|
| Ex. II-1 | 58.3 |
| Ex. II-2 | 62.1 |
| Ex. II-3 | 61.1 |
| Ex. II-4 | 69.3 |
| Ex. II-5 | 91.2 |
| Comp. Ex. II-1 | 34.3 |
| Comp. Ex. II-2 | 38.2 |
| Comp. Ex. II-3 | 27.8 |
| Comp. Ex. II-4 | 50.4 |

As can be seen from Table 4, the catalytic activity of hydrocracking catalysts containing the phosphorus-containing molecular sieve according to the present application is increased by about 7.9-63.4%, as compared to hydrocracking catalysts containing the molecular sieve prepared by conventional methods under the same reaction conditions.

Preferred embodiments of the present application have been described in detail with reference to the accompanying drawings. However, the present application is not limited to those embodiments, and various modifications can be made without departing from the spirit of the present application. Such modifications also fall within the scope of the present application.

It should be noted that various features described in the above embodiments can be combined in any suitable manner without contradiction, and, to avoid unnecessary repetition, those possible combinations are not described separately herein.

In addition, arbitrary combinations of embodiments of the present application may also be made, and those combinations should be considered as a part of the disclosure of the present application as long as it does not depart from the spirit of the present application.

The invention claimed is:

1. A phosphorus-containing Y molecular sieve, having a phosphorus content of about 0.3 wt % to about 5 wt %, calculated as oxide, a pore volume of about 0.2 ml/g to about 0.95 ml/g, and a ratio of Bronsted acid content to Lewis acid content of about 3.4 to about 9.5,
   wherein the phosphorus-containing Y molecular sieve is produced using a method comprising hydrothermally treating a phosphorus-containing molecular sieve starting material; mixing the hydrothermally treated phosphorus-containing molecular sieve starting material with water to form a slurry; and acid leaching by adding an acid solution to the slurry at a temperature of about 40° C. to about 95° C. at a substantially constant rate in a range of about 0.05 mol/hr to about 10 mol/hr, calculated on the basis of H$^+$ relative to 1L of the slurry; subjecting the slurry to an isothermal reaction for about 0.5 h to about 20 h, wherein a ratio of a weight of an acid in the acid solution to a dry weight of the phosphorus-containing molecular sieve starting material is in a range of about 0.01:1 to about 0.6:1, and
   the phosphorus-containing Y molecular sieve has a 27Al-NMR structural spectrum showing an $I_{60ppm}/I_{-1ppm}$ of about 5 to about 40, and an $I_{-1ppm}/I_{\pm 6ppm}$ of about 0.4 to about 2.

2. The phosphorus-containing Y molecular sieve of claim 1, wherein the phosphorus-containing Y molecular sieve has a lattice constant of 2.425-2.470 nm and a specific surface area of about 250-850 m$^2$/g.

3. The phosphorous-containing Y molecular sieve of claim 1, wherein the ratio of the weight of water in the slurry to a dry weight of the phosphorus-containing molecular sieve starting material is in a range of about 14:1 to about 5:1.

4. The phosphorus-containing Y molecular sieve of claim 1, wherein the phosphorus-containing molecular sieve starting material has a phosphorus content of about 0.1 wt % to about 15 wt %, and a sodium content of about 0.5 wt % to about 4.5 wt %, calculated as oxides and based on the dry weight of the phosphorus-containing molecular sieve starting material.

5. The phosphorus-containing Y molecular sieve of claim 1, wherein the phosphorus-containing molecular sieve starting material is a phosphorus-containing molecular sieve having a lattice constant of 2.425-2.470 nm, a specific surface area of about 250 m$^2$/g to about 750 m$^2$/g, and a pore volume of about 0.2 ml/g to about 0.95 ml/g.

6. The phosphorus-containing Y molecular sieve of claim 1, wherein the phosphorus-containing molecular sieve starting material is in the form of particles, and particles having a particle size of about 1 mm to about 500 mm accounts for about 10 wt % to about 100 wt % of a total weight of the phosphorus-containing molecular sieve starting material, and the particle size is a diameter of a circumscribed circle of the particle.

7. The phosphorus-containing Y molecular sieve of claim 1, wherein the hydrothermal treatment is carried out in the presence of steam at a temperature of about 350° C. to about 700° C. and a pressure of about 0.1 MPa to about 2 MPa for a hydrothermal treatment time of about 0.5 h to about 10 h.

8. The phosphorus-containing Y molecular sieve of claim 1, wherein in the acid leaching comprises adding the acid solution into the slurry a plurality of times, and wherein, in each of the plurality of times, the acid solution is added at a substantially constant rate in a range of about 0.05 mol/h to about 10 mol/h, calculated on the basis of $H^+$ relative to 1L of the molecular sieve slurry, and, after each of the plurality of times, the slurry is subject to an isothermal reaction for a period of time such that the isothermal reaction time is about 0.5 hours to about 20 hours in total.

9. A hydrocracking catalyst, comprising: on a dry basis and based on the weight of the catalyst, about 45 wt % to about 90 wt % of a first metal component, calculated as metal oxide, and about 1 wt % to about 15 wt % of a second metal component, calculated as metal oxide; and a support comprising the phosphorus-containing Y molecular sieve of claim 1 and a refractory inorganic oxide, wherein a weight ratio of the phosphorus-containing molecular sieve to the refractory inorganic oxide is about 0.03:1 to about 20:1, wherein the first metal is a metal of Group VIB and the second metal is a metal of Group VIII.

10. The catalyst of claim 9, wherein the refractory inorganic oxide is selected from alumina, silica, amorphous silica-alumina compounds, zirconia, magnesia, thoria, beryllia, boric oxide, cadmium oxide, and combinations thereof, the first metal is molybdenum and/or tungsten, and the second metal is selected from iron, nickel, cobalt, and combinations thereof.

11. A method for hydrocracking of a hydrocarbon feedstock, comprising a step of contacting the hydrocarbon feedstock with the hydrocracking catalyst of claim 9 under hydrocracking reaction conditions.

12. The method of claim 11, wherein the hydrocarbon feedstock is selected from straight run gas oils, vacuum gas oils, demetallized oils, atmospheric residues, deasphalted vacuum residues, coker distillates, catalytic cracker distillates, shale oils, tar sand oils, coal liquefied oils, and combinations thereof.

13. The method of claim 11, wherein the hydrocracking reaction conditions comprise a reaction temperature of about 200-650° C., a reaction pressure of about 3-24 MPa, a liquid hourly space velocity of about 0.1-10 $h^{-1}$, and a hydrogen-to-oil ratio by volume of about 100-5000 $Nm^3/m^3$.

14. The phosphorus-containing Y molecular sieve of claim 2, wherein the phosphorus-containing Y molecular sieve is selected from NaY, HNaY, REY, USY molecular sieves, and combinations thereof.

15. The phosphorus-containing Y molecular sieve of claim 1, wherein the phosphorus-containing molecular sieve starting material has a water content of about 10 wt % to about 40 wt %.

16. The phosphorus-containing Y molecular sieve of claim 1, wherein a ratio of a weight of an acid in the acid solution to a dry weight of the phosphorus-containing molecular sieve starting material is in a range of about 0.01:1 to about 0.3:1.

17. The phosphorus-containing Y molecular sieve of claim 6, wherein the phosphorus-containing molecular sieve starting material having a particle size of about 5-100 mm accounts for about 30 wt % to about 100 wt % of the total weight of the phosphorus-containing molecular sieve starting material.

18. The phosphorus-containing Y molecular sieve of claim 7, wherein the acid solution used in the acid leaching has an acid concentration of about 0.01 mol/L to about 15.0 mol/L, and the acid is selected from phosphoric acid, sulfuric acid, nitric acid, hydrochloric acid, acetic acid, citric acid, tartaric acid, formic acid, acetic acid, and combinations thereof.

19. The phosphorus-containing Y molecular sieve of claim 1, wherein the phosphorus-containing Y molecular sieve has a phosphorus content of 0.4 wt % to 2.0 wt %, calculated as oxide, a pore volume of 0.25 ml/g to 0.60 ml/g, and a ratio of Bronsted acid content to Lewis acid content of 3.4 to 9.5, and wherein the phosphorus-containing Y molecular sieve has a 27Al-NMR structural spectrum showing an $I_{60ppm}/I_{-1ppm}$ of 10.0 to 39, and an $I_{-1ppm}/I_{\pm 6ppm}$ of 0.4 to 2.

* * * * *